United States Patent
Yener et al.

(10) Patent No.: US 10,280,350 B2
(45) Date of Patent: May 7, 2019

(54) COMPOSITE SHAPED ABRASIVE PARTICLES AND METHOD OF FORMING SAME

(71) Applicant: Saint-Gobain Ceramics & Plastics, Inc., Worcester, MA (US)

(72) Inventors: Doruk O. Yener, Wilmington, MA (US); Paul Braun, Providence, RI (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 217 days.

(21) Appl. No.: 14/279,531

(22) Filed: May 16, 2014

(65) Prior Publication Data

US 2014/0250797 A1    Sep. 11, 2014

Related U.S. Application Data

(63) Continuation of application No. 13/731,793, filed on Dec. 31, 2012, now Pat. No. 8,764,863.

(60) Provisional application No. 61/581,831, filed on Dec. 30, 2011.

(51) Int. Cl.
*C09K 3/14* (2006.01)
*C04B 35/64* (2006.01)
*C04B 35/111* (2006.01)

(52) U.S. Cl.
CPC ........ *C09K 3/1409* (2013.01); *C04B 35/1115* (2013.01); *C04B 35/64* (2013.01); *C09K 3/1436* (2013.01); *C04B 2235/3244* (2013.01); *C04B 2235/94* (2013.01); *C04B 2235/96* (2013.01)

(58) Field of Classification Search
None
See application file for complete search history.

(56) References Cited

U.S. PATENT DOCUMENTS

| | | |
|---|---|---|
| 2,036,903 A | 4/1936 | Webster |
| 2,248,064 A | 7/1941 | Carlton et al. |
| 2,376,343 A | 5/1945 | Carlton |
| 3,067,551 A | 12/1962 | Maginnis |
| 3,608,134 A | 9/1971 | Cook |
| 3,619,151 A | 11/1971 | Sheets, Jr. et al. |
| 3,670,467 A | 6/1972 | Walker |
| 3,991,527 A | 11/1976 | Maran |

(Continued)

FOREIGN PATENT DOCUMENTS

| | | |
|---|---|---|
| CA | 2423788 A1 | 7/2002 |
| CN | 1158167 | 7/2004 |

(Continued)

OTHER PUBLICATIONS

Vanstrum et al., Precisely Shaped Grain (PSG): 3M's Innovation in Abrasive Grain Technology, date unknown, 1 page.

(Continued)

*Primary Examiner* — Kaj K Olsen
*Assistant Examiner* — Ross J Christie
(74) *Attorney, Agent, or Firm* — Abel Law Group, LLP; Adam Keser

(57) ABSTRACT

A method of forming a shaped abrasive particle includes forming a first mixture and a second mixture in a single forming process into an integral precursor shaped abrasive particle, wherein the first mixture has a different composition than a composition of the second mixture.

17 Claims, 15 Drawing Sheets

(56) References Cited

U.S. PATENT DOCUMENTS

| | | |
|---|---|---|
| 4,261,706 A | 4/1981 | Blanding et al. |
| 4,457,767 A | 7/1984 | Poon et al. |
| 4,469,758 A | 9/1984 | Scott |
| 4,541,842 A | 7/1985 | Rostoker |
| 4,570,048 A | 2/1986 | Poole |
| 4,656,330 A | 4/1987 | Poole |
| 4,657,754 A | 4/1987 | Bauer et al. |
| 4,678,560 A | 7/1987 | Stole et al. |
| 4,711,750 A | 12/1987 | Scott |
| 4,728,043 A | 3/1988 | Ersdal et al. |
| 4,789,596 A | 12/1988 | Allen et al. |
| 4,797,139 A | 1/1989 | Bauer |
| 4,797,269 A | 1/1989 | Bauer et al. |
| 4,863,573 A | 9/1989 | Moore et al. |
| 4,867,758 A | 9/1989 | Newkirk |
| 4,917,852 A | 4/1990 | Poole et al. |
| 4,918,116 A | 4/1990 | Gardziella et al. |
| 4,970,057 A | 11/1990 | Wilkens et al. |
| 5,000,760 A | 3/1991 | Ohtsubo et al. |
| 5,032,304 A | 7/1991 | Toyota |
| 5,076,991 A | 12/1991 | Poole et al. |
| 5,131,926 A | 7/1992 | Rostoker et al. |
| 5,132,984 A | 7/1992 | Simpson |
| 5,160,509 A | 11/1992 | Carman et al. |
| 5,178,849 A | 1/1993 | Bauer |
| 5,203,886 A | 4/1993 | Sheldon et al. |
| 5,213,591 A | 5/1993 | Celikkaya et al. |
| 5,221,294 A | 6/1993 | Carman et al. |
| 5,244,849 A | 9/1993 | Roy et al. |
| 5,277,702 A | 1/1994 | Thibault et al. |
| 5,300,130 A | 4/1994 | Rostoker |
| 5,314,513 A | 5/1994 | Miller et al. |
| 5,373,786 A | 12/1994 | Umaba |
| 5,383,945 A | 1/1995 | Cottringer et al. |
| 5,395,407 A | 3/1995 | Cottringer et al. |
| 5,429,648 A | 7/1995 | Wu |
| 5,500,273 A | 3/1996 | Holmes et al. |
| 5,514,631 A | 5/1996 | Cottringer et al. |
| 5,516,347 A | 5/1996 | Garg |
| 5,527,369 A | 6/1996 | Garg |
| 5,549,962 A | 8/1996 | Holmes et al. |
| 5,567,214 A | 10/1996 | Ashley |
| 5,578,222 A | 11/1996 | Trischuk et al. |
| 5,591,685 A | 1/1997 | Mitomo et al. |
| 5,593,468 A | 1/1997 | Khaund et al. |
| 5,603,738 A | 2/1997 | Zeiringer et al. |
| 5,641,469 A | 6/1997 | Garg et al. |
| RE35,570 E | 7/1997 | Rowenhorst et al. |
| 5,651,925 A | 7/1997 | Ashley et al. |
| 5,738,696 A | 4/1998 | Wu |
| 5,738,697 A | 4/1998 | Wu et al. |
| 5,785,722 A | 7/1998 | Garg et al. |
| 5,820,450 A | 10/1998 | Calhoun |
| 5,980,678 A | 11/1999 | Tselesin |
| 5,989,301 A | 11/1999 | Laconto, Sr. et al. |
| 6,016,660 A | 1/2000 | Abramshe |
| 6,027,326 A | 2/2000 | Cesarano, III et al. |
| 6,048,577 A | 4/2000 | Garg |
| 6,083,622 A | 7/2000 | Garg et al. |
| 6,110,241 A | 8/2000 | Sung |
| 6,136,288 A | 10/2000 | Bauer et al. |
| 6,179,887 B1 | 1/2001 | Barber, Jr. et al. |
| 6,238,450 B1 | 5/2001 | Garg et al. |
| 6,258,137 B1 | 7/2001 | Garg et al. |
| 6,258,141 B1 | 7/2001 | Sung et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,572,554 B2 | 6/2003 | Yock |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,959,695 B2 | 6/2011 | Yener et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,852,643 B2 | 10/2014 | Gonzales et al. |
| 9,017,439 B2 | 4/2015 | Yener et al. |

(56) References Cited

U.S. PATENT DOCUMENTS

| | | |
|---|---|---|
| 2002/0068518 A1 | 6/2002 | Cesena et al. |
| 2002/0170236 A1 | 11/2002 | Larson et al. |
| 2004/0137834 A1* | 7/2004 | Webb .................. B24D 3/28 451/526 |
| 2004/0148868 A1 | 8/2004 | Anderson et al. |
| 2005/0081455 A1 | 4/2005 | Welygan et al. |
| 2005/0245179 A1 | 11/2005 | Luedeke |
| 2005/0255801 A1 | 11/2005 | Pollasky |
| 2006/0177488 A1 | 8/2006 | Caruso et al. |
| 2010/0040767 A1 | 2/2010 | Uibel et al. |
| 2010/0068974 A1 | 3/2010 | Dumm |
| 2010/0251625 A1 | 10/2010 | Gaeta |
| 2011/0065362 A1 | 3/2011 | Woo et al. |
| 2011/0289854 A1 | 12/2011 | Moren et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0153547 A1 | 6/2012 | Bauer et al. |
| 2012/0167481 A1 | 7/2012 | Yener et al. |
| 2012/0231711 A1 | 9/2012 | Keipert et al. |
| 2012/0308837 A1 | 12/2012 | Schlechtriemen et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |
| 2018/0215975 A1 | 8/2018 | Marazano et al. |
| 2018/0215976 A1 | 8/2018 | Cotter et al. |

FOREIGN PATENT DOCUMENTS

| | | |
|---|---|---|
| CN | 102123837 B | 7/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 293163 A2 * | 11/1988 |
| EP | 0652919 A1 | 5/1995 |
| EP | 0651778 B1 | 5/1998 |
| EP | 0614861 B1 | 5/2001 |
| EP | 0931032 B1 | 7/2001 |
| EP | 1356152 A2 | 10/2003 |
| EP | 1383631 B1 | 1/2004 |
| EP | 1015181 B1 | 3/2004 |
| EP | 2184134 A1 | 5/2010 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692815 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 1466054 | 3/1977 |
| JP | 62002946 B | 1/1987 |
| JP | S6343990 A | 2/1988 |
| JP | S6411183 A | 1/1989 |
| JP | H0236293 A | 2/1990 |
| JP | 2011515234 A | 5/2011 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 9915311 A1 | 4/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2006/027593 | 3/2006 |
| WO | 2007/041538 A1 | 4/2007 |

(56) References Cited

FOREIGN PATENT DOCUMENTS

| | | |
|---|---|---|
| WO | 2010/077509 A1 | 7/2010 |
| WO | 2010/151201 | 12/2010 |
| WO | 2011068714 A2 | 6/2011 |
| WO | 2011087649 A2 | 7/2011 |
| WO | 2011/109188 A2 | 9/2011 |
| WO | 2011/149625 A2 | 12/2011 |
| WO | 2011149625 A2 | 12/2011 |
| WO | 2012/092590 A2 | 7/2012 |
| WO | 2012/092605 A2 | 7/2012 |
| WO | 2013/003830 A2 | 1/2013 |
| WO | 2013/003831 A2 | 1/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/149209 A1 | 10/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A1 | 9/2017 |
| WO | 2017/151498 A1 | 9/2017 |
| WO | 2018/010730 A2 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |
| WO | 2018/134732 A1 | 7/2018 |
| WO | 2018/136268 A1 | 7/2018 |
| WO | 2018/136269 A1 | 7/2018 |
| WO | 2018/136271 A1 | 7/2018 |

OTHER PUBLICATIONS

DOW Machine Tool Accessories, Grinding & Surface Finishing, www.1mta.com, Nov. 2014, 72 pages.

3M Cubitron II Abrasive Belts Brochure, Shaping the Future, Jan. 2011, 6 pages.

Graf, "Cubitron II: Precision-Shaped Grain (PSG) Turns the Concept of Gear Grinding Upside Down," gearsolutions.com, May 2014, pp. 36-44.

International Search Report and Written Opinion for PCT/US2012/072231 dated Apr. 16, 2013, 12 pages.

European Search Report for, Application No. 12862932.6, dated Nov. 26, 2015, 1 page.

\* cited by examiner

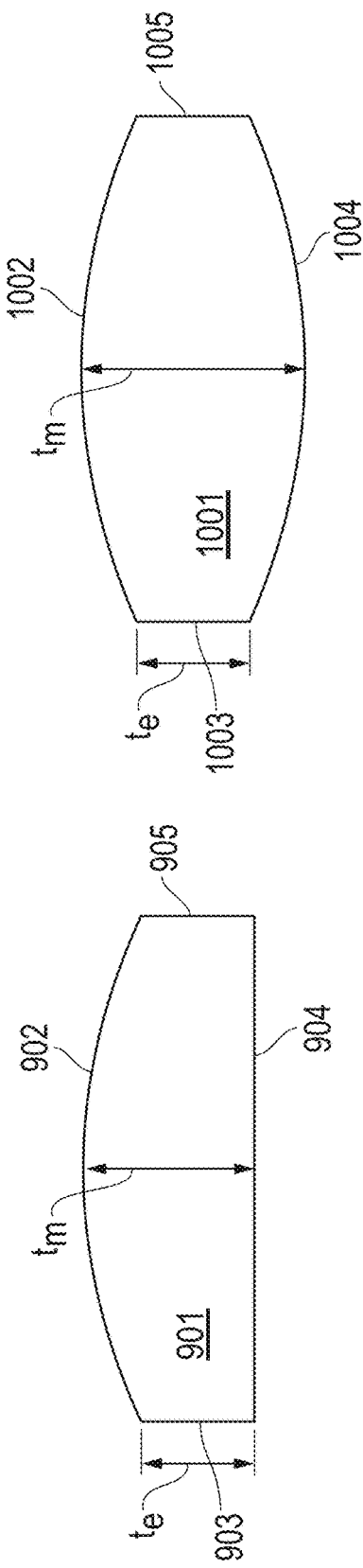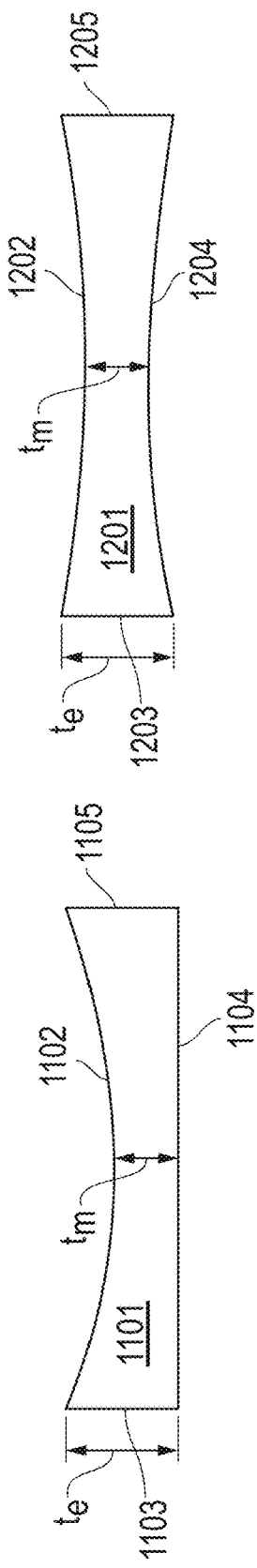
FIG. 9
FIG. 10
FIG. 11
FIG. 12

COMPOSITE SHAPED ABRASIVE PARTICLES AND METHOD OF FORMING SAME

CROSS-REFERENCE TO RELATED APPLICATION(S)

This application is a continuation of and claims priority under 35 U.S.C. § 120 to U.S. patent application Ser. No. 13/731,793, filed Dec. 31, 2012, entitled "Composite Shaped Abrasive Particles and Method of Forming Same" by Doruk O. Yener, et al., which claims priority under 35 U.S.C. § 119(e) to U.S. Patent Application No. 61/581,831 entitled "Composite Shaped Abrasive Particles and Method of Forming Same," by Doruk O. Yener, et al., filed Dec. 30, 2011, both of which are assigned to the current assignee hereof and incorporated herein by reference in its entirety.

BACKGROUND

Field of the Disclosure

The following is directed to shaped abrasive particles, and more particularly, to composite shaped abrasive particles having certain features and methods of forming such composite shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

In one aspect, a particulate material includes a shaped abrasive particle having a body comprising a first layer including a central region including the geometric center of the body having a first dopant concentration ($D_{1c}$) and a second layer overlying the first layer, the second layer including a peripheral region including an external surface of the body spaced apart from the geometric center having a second dopant concentration ($D_{2c}$), and wherein the body has a dopant concentration difference ($\Delta D_c$) between the first dopant concentration and the second dopant concentration of at least about 0.2 wt %.

In another aspect, a shaped abrasive particle includes a body having a first layer including having a first dopant concentration (D1c), a second layer overlying the first layer and having a second dopant concentration (D2c), and wherein the first layer and the second layer differ in composition by at least one dopant material selected from the group of elements consisting Li, Na, K, Rb, Cs, Mg, Ca, Sr, Ba, Sc, Y, La, Zr, Hf, Ce, Pr, V, Nb, Ta, Mn, Fe, and a combination thereof.

According to another aspect, a method of forming a shaped abrasive particle includes forming a first mixture and a second mixture in a single forming process into an integral precursor shaped abrasive particle, wherein the first mixture has a different composition than a composition of the second mixture.

In yet another aspect, a method of forming a shaped abrasive particle includes extruding a first mixture from a first die through an opening in a first screen and extruding a second mixture from a second die through the opening in a second screen to form a composite precursor shaped abrasive particle comprising the first mixture and second mixture, wherein the first mixture has a composition different than a composition of the second mixture.

For still another aspect, a coated abrasive article includes a substrate and a shaped abrasive particle overlying the substrate having a body comprising a first portion including a central region including the geometric center of the body having a first dopant concentration ($D_{1c}$) and a second portion comprising a peripheral region including an external surface of the body spaced apart from the geometric center having a second dopant concentration ($D_{2c}$), wherein the body comprises a dopant concentration difference ($\Delta D_c$) between the first dopant concentration and the second dopant concentration.

According to another aspect, a particulate material includes a shaped abrasive particle having a body comprising a first layer, a second layer overlying the first layer and comprising a second dopant, and wherein first layer and second layer are arranged in a stepped configuration with respect to each other.

For another aspect, a particulate material includes a shaped abrasive particle having a body comprising, a first layer, a second layer overlying the first layer and comprising a second dopant, and a diffusion interface disposed between the first layer and the second layer.

BRIEF DESCRIPTION OF THE DRAWINGS

The present disclosure may be better understood, and its numerous features and advantages made apparent to those skilled in the art by referencing the accompanying drawings.

FIGS. 9-12 include cross-sectional illustrations of portions of shaped abrasive particles in accordance with an embodiment.

DETAILED DESCRIPTION

The following is directed to methods of forming shaped abrasive particles and features of such shaped abrasive particles. The shaped abrasive particles may be used in various abrasive articles, including for example bonded abrasive articles, coated abrasive articles, and the like. Alternatively, the shaped abrasive particles of the embodiments herein may be utilized in free abrasive technologies, including for example grinding and/or polishing slurries.

Figure 1:
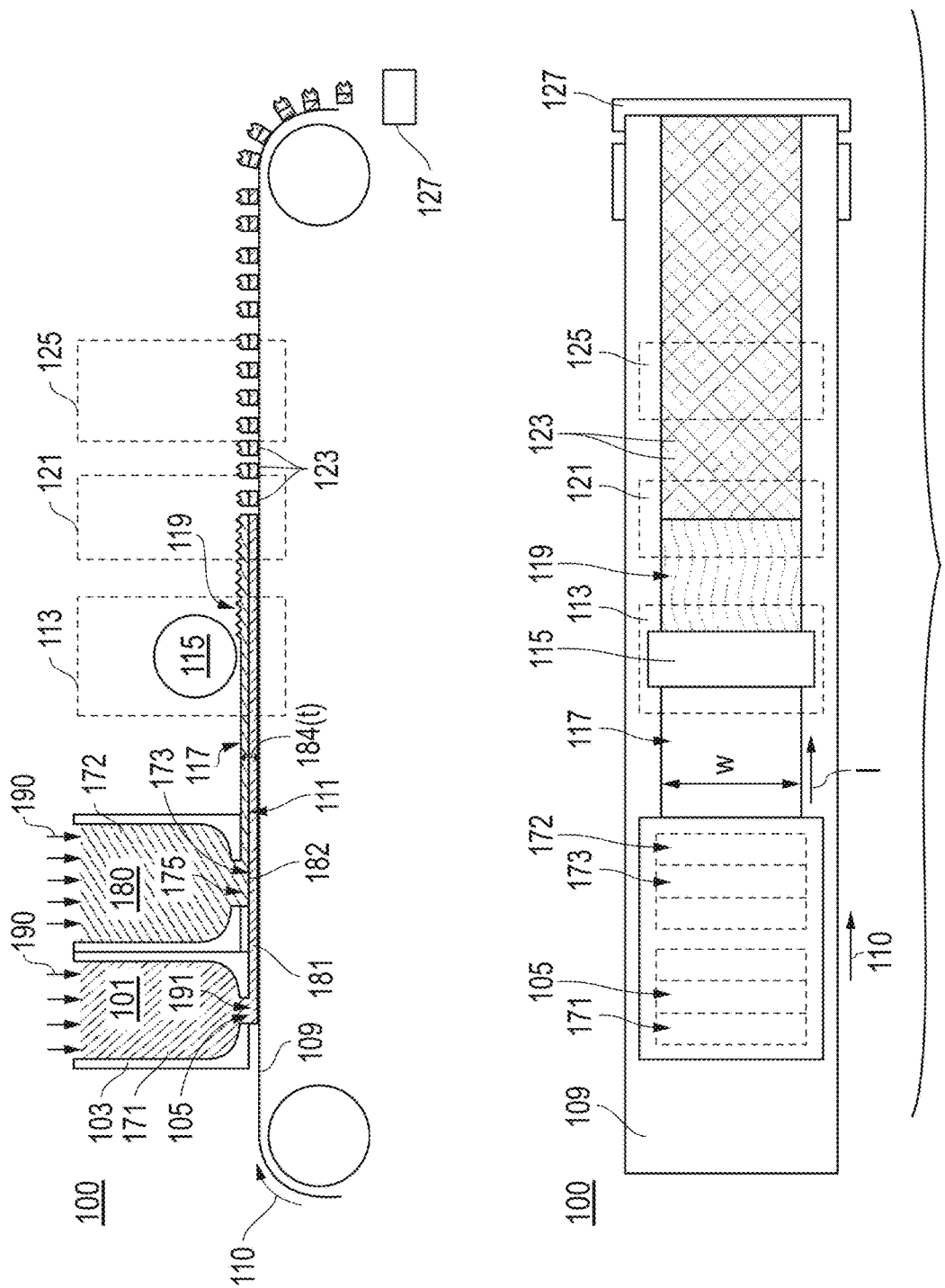
FIG. 1 includes a schematic of a system for forming a particulate material in accordance with an embodiment.

FIG. 1 includes a schematic of a system 100 used for forming a particulate material in accordance with an embodiment. Notably, the system 100 may be used in the formation of composite precursor shaped abrasive particles. It will be appreciated that the formation of composite precursor shaped abrasive particles may facilitate the formation of composite shaped abrasive particles.

As illustrated, the system 100 can include a belt 109 which may be translated in a direction of 110 under a die 103. In particular instances, the die 103 can include a first reservoir 171 configured to contain a first mixture 101, and a second reservoir 172 separate from the first reservoir 171 and configured to contain a second mixture 180. In particular, the mixture 101 can be a gel formed of a ceramic powder material and a liquid, wherein the gel can be characterized as a shape-stable material having the ability to hold a given shape even in the green (i.e., unfired) state. In accordance with an embodiment, the gel can be formed of the ceramic powder material as an integrated network of discrete particles.

The mixture 101 can be formed to have a particular content of solid material, such as a ceramic powder material. For example, in one embodiment, the mixture 101 can have a solids content of at least about 25 wt %, such as at least about 35 wt %, or even at least about 42 wt % for the total weight of the mixture 101. Still, in at least one non-limiting embodiment, the solid content of the mixture 101 can be not greater than about 75 wt %, such as not greater than about 70 wt %, not greater than about 65 wt %, or even not greater than about 55 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3.H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 101 can be formed to have a particular content of liquid material. Some suitable liquids may include organic materials, such as water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 65 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1\times10^4$ Pa, such as at least about $4\times10^4$ Pa, or even at least about $5\times10^4$ Pa. However, in at least one non-limiting embodiment, the mixture 101 may have a storage modulus of not greater than about $1\times10^7$ Pa, such as not greater than about $1\times10^6$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the get into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported. The viscosity can be calculated by dividing the storage modulus value by 6.28 s-1.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or even at least about $65 \times 10^3$ Pa s. In at least one non-limiting embodiment, the mixture 101 may have a viscosity of not greater than about $1 \times 10^6$ Pa s, not greater than about $5 \times 10^5$ Pa s, not greater than about $3 \times 10^5$ Pa s, or even not greater than about $2 \times 10^5$ Pa s. It will be appreciated that the viscosity of the mixture 101 can be within a range between any of the minimum and maximum values noted above.

Moreover, the mixture 101 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture 101 that is distinct from slurries used in conventional tape casting operations. For example, the content of organic materials within the mixture 101, particularly, any of the organic additives noted above may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 101 can have a pH of less than about 5, and more particularly, within a range between about 2 and about 4, using a nitric acid additive.

Notably, the second mixture 180 can be a gel having any of the same characteristics of the first mixture 101, including for example, storage modulus, amount of solid material, amount of liquid material, and amount of organic material. Still, in particular instances, the second mixture 180 can have at least one feature that is different from the first mixture 101. In particular instances, the first mixture 101 and second mixture 180 can have different compositions, wherein at least one element between the two mixtures is different. For example, the first mixture 101 may contain a dopant material that is not present in the second mixture 180. Alternatively, the second mixture 180 can have a dopant material that is absent in the first mixture 101.

In yet another embodiment, the first mixture 101 can be different from the second mixture 180 on the basis of content of components within the mixture. For example, one of the mixtures can contain an amount of an additive, such as a binder, pore former, fibrous materials, and the like that is different than the amount of said additive in the other mixture. In another embodiment, the first mixture 101 may contain a different amount of solid material, such as a ceramic powder material, as compared to the second mixture 180. In still other embodiments, the first mixture 101 can contain a different amount of liquid material as compared to the amount of liquid material in the second mixture 180. Moreover, the first mixture 101 may have different properties, such as storage modulus, as compared to the second mixture 180.

As further illustrated, the die 103 can be formed such that the first mixture 101 can be contained within the reservoir 171 separate from the reservoir 172. The first mixture 101 can be extruded in a direction 191 through a die opening 105 onto the belt 109 underlying the die opening 105. In fact, the first mixture 101 may be extruded directly on to the belt 109 after exiting the die 103 through the die opening 105. As such, in particular instances, the system 100 can be used to facilitate extruding the first mixture 101 onto the belt 109 to form a first form that can be translated along the belt 109 in the direction 110.

In accordance with an embodiment, the die opening 105 can have a rectangular shape. Furthermore, the mixture 101 extruded through the die opening 105 can have essentially the same cross-sectional shape as the die opening 105. As such, for certain embodiments, the mixture 101 may be extruded as a form. Reference herein to a form is a general reference to any shaped ceramic body. The form can have various shapes and contours depending upon the shape desired and the method of forming. In the illustrated embodiment, the process can include extruding a form having the shape of a sheet 111. The sheet 111 can have a generally rectangular cross-sectional shape as viewed in a plane defined by a thickness (t) and width (w) of the sheet 111.

Extrusion of the first material 101 can be facilitated by applying a force 190 (or a pressure) on the mixture 101 to facilitate extruding the mixture 101 through the die opening 105. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above.

As further illustrated, the system 100 can include extrusion of the second material 180 from the reservoir 172 in the direction 175 through a die opening 173. Notably, the die opening 173 can be spaced apart from and distinct from the die opening 105. It will be appreciated that extrusion of the second material 180 from the second reservoir 172 may be facilitated by the application of a pressure in a direction 180. In certain instances, the force used to extrude the second mixture 180 may be essentially the same as the force used to extrude the first material 101 from the reservoir 171. Still, in other instances, the force used to extrude the second mixture 180 from the reservoir 172 may be different than the force used to extrude the first material 101 from the reservoir 171.

In accordance with an embodiment, the process can include the formation of a composite sheet 111 wherein the system 100 can include the formation of a first sheet 181 and the formation of a second sheet 182 overlying the first sheet 181. In certain instances, the first sheet 181 may be underlying the second sheet 182, and more particularly, the first sheet 181 may be in direct contact with the second sheet 182. Furthermore, it will be appreciated that while the composite sheet 111 is illustrated as being formed from a first sheet 181 and a second sheet 182, additional mixtures or material may be formed to add more portions or layers to the composite sheet 111.

In particular instances, the system 100 can be characterized as a co-extrusion process, wherein the first mixture 101 and the second mixture 180 are extruded simultaneously on the translating belt 109 to facilitate the formation of the composite sheet 111. Furthermore, while system 100 has illustrated a particular arrangement between the first die opening 105 and second die opening 173, alternative arrangements of dies may be utilized. For example, in other embodiments the die openings 105 and 173 may be arranged in a coaxial relationship with respect to each other. In still other embodiments, the die openings 105 and 173 may be arranged in a laterally adjacent orientation, such that the die openings are side-by-side in a dimension of the width of the sheet 111. Moreover, it will be appreciated that the system 100 may use different dies, wherein each die opening is associated with a distinct and separate die.

Also, while the system 100 has illustrated a die 103 include two die openings 105 and 173, other dies may include additional die openings associated with additional reservoirs. For example, the die 103 may contain a third reservoir configured to contain a third mixture. The third mixture may be different as compared to the first mixture 101 or the second mixture 171. Moreover, the third mixture may be co-extruded with the first and second mixture to facilitate the formation of a composite extrudate form including the first mixture 101, second mixture 171, and third mixture.

In some embodiments, the belt 109 can be translated while extruding the mixture 101 through the die opening 105. As illustrated in the system 100, the mixture 101 may be extruded in a direction 191. The direction of translation 110 of the belt 109 can be angled relative to the direction of extrusion 191 of the mixture. While the angle between the direction of translation 110 and the direction of extrusion 191 are illustrated as substantially orthogonal in the system 100, other angles are contemplated, including for example, an acute angle or an obtuse angle. Moreover, while the mixture 101 is illustrated as being extruded in a direction 191, which is angled relative to the direction of translation 110 of the belt 109, in an alternative embodiment, the belt 109 and mixture 101 may be extruded in substantially the same direction.

The belt 109 may be translated at a particular rate to facilitate processing. For example, the belt 109 may be translated at a rate of at least about 3 cm/s. In other embodiments, the rate of translation of the belt 109 may be greater, such as at least about 4 cm/s, at least about 6 cm/s, at least about 8 cm/s, or even at least about 10 cm/s. Still, in at least one non-limiting embodiment, the belt 109 may be translated in a direction 110 at a rate of not greater than about 5 m/s, not greater than about 1 m/s, or even not greater than about 0.5 m/s. It will be appreciated that the screen 151 may be translated at a rate within a range between any of the minimum and maximum values noted above.

For certain processes according to embodiments herein, the rate of translation of the belt 109 as compared to the rate of extrusion of the mixture 101 in the direction 191 may be controlled to facilitate proper processing. For example, the rate of translation of the belt 109 can be essentially the same as the rate of extrusion to ensure formation of a suitable sheet 111.

After the mixture 101 is extruded through the die opening 105, the mixture 101 may be translated along the belt 109 under a knife edge 107 attached to a surface of the die 103. The knife edge 107 may facilitate forming a sheet 111. The sheet 111 can have particular dimensions, including for example a length (l), a width (w), and a thickness (t). In accordance with an embodiment, the sheet 111 may have a length that extends in the direction of the translating belt 109, which can be greater than the width, wherein the width of the sheet 111 is a dimension extending in a direction perpendicular to the length of the belt 109 and to the length of the sheet. The sheet 111 can have a thickness 184, wherein the length and width are greater than the thickness 184 of the sheet 111. According to one embodiment, the sheet 111 can have a length (l), a width (w), and a height (h), wherein the length>width>height. Moreover, the sheet 111 can have a secondary aspect ratio of length:height of at least about 10, such as at least about 100, at least about 1000, or even at least about 1000.

Notably, the thickness 184 of the sheet 111 can be the dimension extending vertically from the surface of the belt 109. In accordance with an embodiment, the sheet 111 can be formed to have a particular dimension of thickness 184, wherein the thickness may be an average thickness of the sheet 111 derived from multiple measurements. For example, the thickness 184 of the sheet 111 can be at least about 0.1 mm, such as at least about 0.5 mm. In other instances, the thickness 184 of the sheet 111 can be greater, such as at least about 0.8 mm, at least about 1 mm, at least about 1.2 mm, at least about 1.6 mm, or even at least about 2 mm. Still, in one non-limiting embodiment, the thickness 184 of the sheet 111 may be not greater than about 10 mm, not greater than about 5 mm, or even not greater than about 2 mm. It will be appreciated that the sheet 111 may have an average thickness within a range between any of the minimum and maximum values noted above.

After extruding the mixture 101 from the die 103, the sheet 111 may be translated in a direction 112 along the surface of the belt 109. Translation of the sheet 111 along the belt 109 may facilitate further processing to form precursor shaped abrasive particles. For example, the sheet 111 may undergo a shaping process within the shaping zone 113. In particular instances, the process of shaping can include shaping a surface of the sheet 111, including for example, an upper major surface 117 of the sheet 111. In other embodiments, other major surfaces of the sheet may undergo shaping, including for example, the bottom surface or side surfaces. For certain processes, shaping can include altering a contour of the sheet through one or more processes, such as, embossing, rolling, cutting, engraving, patterning, stretching, twisting, and a combination thereof.

In one particular embodiment, the process of shaping can include forming a feature 119 in the upper major surface 117 of the sheet 111. More particularly, a shaping structure 115 may be contacted to the upper major surface 117 of the sheet 111 facilitating the formation of a feature 119 or a pattern of features in the upper major surface 117. It will be appreciated that the shaping structure 115 can take various forms, including for example, a roller having various features on its surface, wherein such features may be imparted to the upper major surface 117 of the sheet 111 upon contact between the shaping structure 115 and the upper major surface 117.

Still, it will be appreciated that alternative shaping structures and methods of shaping a sheet may be utilized. For example, the surface of the belt 109 may be textured such that features of the texture are imparted to the sheet 111, and the finally-formed shaped abrasive particles. Moreover, various devices may be used to impart a feature or pattern of features on the side surfaces of the sheet 111.

In accordance with an embodiment, the process of forming a shaped abrasive particle can further include translation of the sheet 111 along the belt 109 through a forming zone 121. In accordance with an embodiment, the process of forming a shaped abrasive particle can include sectioning the sheet 111 to form precursor shaped abrasive particles 123. For example, in certain instances, forming can include perforating a portion of the sheet 111. In other instances, the process of forming can include patterning the sheet 111 to form a patterned sheet and extracting shapes from the patterned sheet.

Particular processes of forming can include cutting, pressing, punching, crushing, rolling, twisting, bending, drying, and a combination thereof. In one embodiment, the process of forming can include sectioning of the sheet 111. Sectioning of the sheet 111 can include the use of at least one mechanical object, which may be in the form of a gas, liquid, or solid material. The process of sectioning can include at least one or a combination of cutting, pressing, punching, crushing, rolling, twisting, bending, and drying. Moreover, it will be appreciated that sectioning can include perforating or creating a partial opening through a portion of the sheet 111, which may not extend through the entire height of the sheet 111. For example, sectioning can include a water jet cutting process. In another embodiment, sectioning of the sheet 111 can include use of a mechanical object including one or a plurality of a blade, a wire, a disc, and a combination thereof. The blades may be oriented relative to each other in a variety of configurations to achieve the desired sectioning. For example, the blades may be arranged parallel to each other, such as in a gang configuration. Alternatively, the mechanical object may include a set of spiral blades connected to each other or independent of each other.

Alternatively, the process of forming shaped abrasive particles can include the use of radiation to section the sheet 111 into discrete precursor shaped abrasive particles. For example, use of radiation may include the use of a laser to score or otherwise cut discrete shaped abrasive particles from the sheet 111.

It will be appreciated that at least one blade may be translated through the sheet 111 to facilitate sectioning. In particular instances, a sectioning process using a blade can include translating a blade in multiple directions including a first direction, and a second direction different than the first direction through the sheet 111. More notably, certain sectioning processes may utilize a plurality of blades that can be translated across and through the sheet 111 in multiple directions to facilitate the formation of precursor shaped abrasive particles 123.

In certain instances, the method of sectioning can include maintaining an opening or perforation formed in the sheet 111. Maintaining the opening after sectioning the sheet 111 by a mechanical object may facilitate suitable formation of shaped abrasive particles and features of shaped abrasive particles and features of a batch of shaped abrasive particles. Maintaining the opening can include at least partially drying at least one surface of the sheet 111 defining the opening. The process of at least partially drying can include directing a drying material at the opening. A drying material may include a liquid, a solid, or even a gas. According to one particular embodiment, the drying material can include air. Furthermore, the process of maintaining the opening can include selectively directing a drying material, such as a gas, at the opening and limiting the impingement of gas on other surfaces of the sheet 111 substantially spaced apart from the opening.

In certain instances, the process of sectioning can be conducted prior to sufficient drying of the sheet. For example, sectioning can be conducted prior to volatilization of not greater than about 20% of the liquid from the sheet 111 as compared to the original liquid content of the sheet during initial formation of the sheet 111. In other embodiments, the amount of volatilization allowed to occur before or during sectioning can be less, such as, not greater than about 15%, not greater than about 12%, not greater than about 10%, not greater than about 8%, or even not greater than about 4% of the original liquid content of the sheet.

As indicated by the description of embodiments herein, sectioning can be conducted simultaneously with the process of forming. Moreover, sectioning can be conducted continuously during the process of forming. Sectioning may not necessarily include a change in composition to the sheet, such as in the case of ablation processes, which rely upon vaporization.

According to one embodiment, sectioning can be conducted at particular conditions to facilitate the forming process. For example, sectioning can be conducted at controlled sectioning conditions including at least one of a controlled humidity, a controlled temperature, a controlled air pressure, a controlled air flow, a controlled environmental gas composition, and a combination thereof. Control of such conditions may facilitate control of the drying of the sheet and facilitate formation of shaped abrasive particles having particular features. According to a particular embodiment, sectioning can include monitoring and control of one or more certain environmental conditions, including but not limited to humidity, temperature, air pressure, air flow, environmental gas composition, and a combination thereof, For at least one embodiment, the temperature of the environment used for sectioning (i.e., sectioning temperature) that can be controlled relative to the temperature of the environment used in other processes. For example, the sectioning temperature can be conducted at a substantially different temperature as compared to the temperature used during forming (e.g., extruding) of the sheet. Alternatively, the temperature used during forming of the sheet can be substantially the same as the sectioning temperature. Moreover, in another embodiment, the mechanical object can have a temperature greater than a temperature of the sheet 111 during sectioning. In an alternative condition, the mechanical object can have a temperature less than a temperature of the sheet 111.

For another aspect, the process of sectioning can include providing at least one opening agent to an opening formed in the sheet 111 after sectioning, wherein the opening agent is sufficient to maintain an opening in the sheet after sectioning. Some suitable methods of providing the opening agent can include depositing, coating, spraying, printing, rolling, transferring, and a combination thereof. In one particular embodiment, the mechanical object can be coated with a least one opening agent, wherein the opening agent can be transferred from a surface of the mechanical object to a surface of the sheet defining the opening. The opening agent can include a material selected from the group of inorganic materials, organic materials, polymers, and a combination thereof. In one embodiment, the opening agent may be a foaming agent, surfactant, and a combination thereof.

Figure 2:
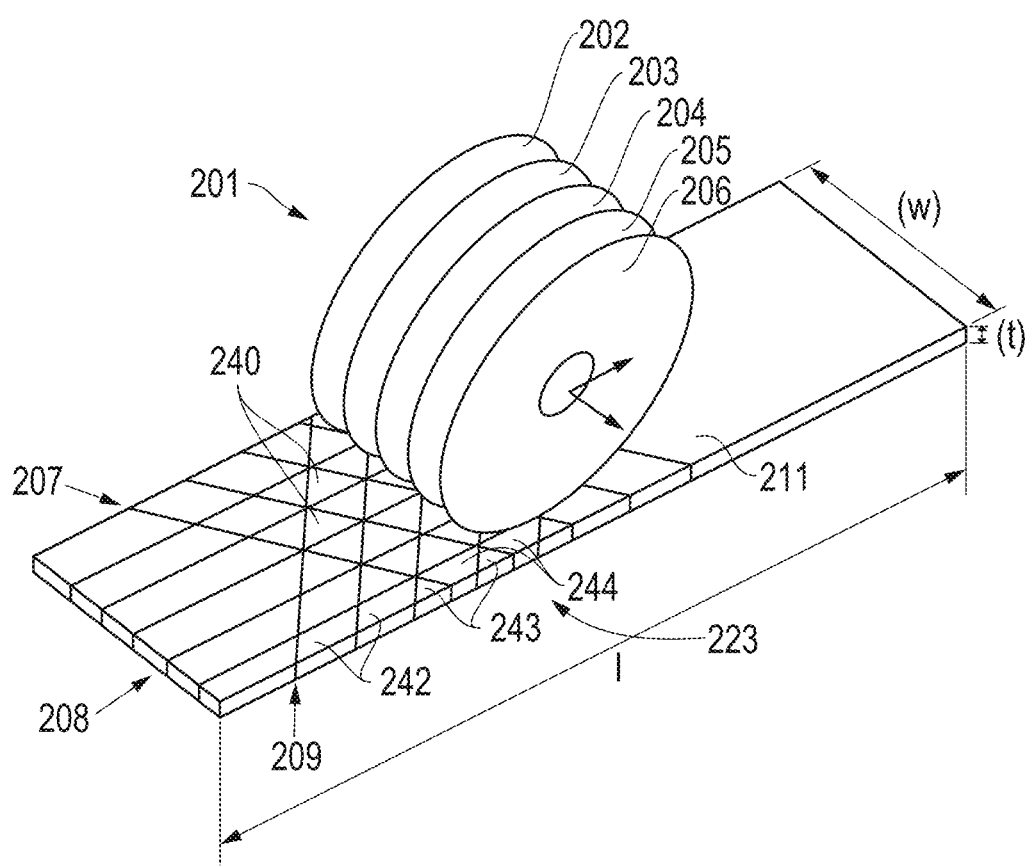
FIG. 2 includes a schematic of a portion of the system for forming a particulate material in accordance with an embodiment.

FIG. 2 includes an illustration of a particular device that may be utilized within the forming zone 121 to facilitate sectioning. As illustrated, the process of sectioning may include the use of a cutting device 201 having a plurality of blades 202, 203, 204, 205, and 206 arranged in parallel to each other. The cutting device 201 can be translated in multiple directions through the sheet 111 to facilitate the formation of precursor shaped abrasive particles 123. For example, as illustrated in FIG. 2, the cutting device 201 may be translated first in a direction 207 angled with respect to the length (l) of the sheet 111. Thereafter, the cutting device 201 may be translated in a second direction 209 different that the first direction 207 and angled with respect to the first direction 207. Finally, the cutting device 201 may be translated across and through the sheet 111 in a third direction 208 that is different than the first direction 207 or second direction 209 to facilitate the formation of precursor shaped abrasive particles. While reference herein has noted that a single cutting device 201 may be translated in multiple directions, it will be appreciated that individual cutting devices may be utilized for discrete and individual cutting directions.

The process of sectioning can create different types of shaped abrasive particles in a single sectioning process. Different types of shaped abrasive particles can be formed from the same processes of the embodiments herein. Different types of shaped abrasive particles include a first type of shaped abrasive particle having a first two-dimensional shape versus a second type of shaped abrasive particle having a different two-dimensional shape. Furthermore, different types of shaped abrasive particles may differ from each other in size. For example, different types of shaped abrasive particles may have different volumes as compared to each other. A single process which is capable of forming different types of shaped abrasive particles may be particularly suited for producing certain types of abrasive articles.

As further illustrated, upon sectioning of the sheet 111 with a cutting device 201, a plurality of precursor shaped abrasive particles may be formed in the sheet 111. In particular instances, as illustrated in FIG. 2, a first type of precursor shaped abrasive particles 240 can be formed from the sheet 111. The precursor shaped abrasive particles 240 may have a generally triangular shape two-dimensional shape as viewed in a plane defined by the length (l) and width (w) of the sheet 111.

Furthermore, the sectioning process may form another type of precursor shaped abrasive particles 243 approximate to, and at, the edge of the sheet 111. The precursor shaped abrasive particles 243 can have a triangular two-dimensional shape as viewed in a plane defined by the length (l) and width (w) of the sheet 111. However, the precursor shaped abrasive particles 243 can be smaller in size as compared to the precursor shaped abrasive particles 240. In particular instances, the precursor shaped abrasive particles 243 can have a volume that is not greater than about 95% of the volume of the precursor shaped abrasive particles 240. Volume may be an average value calculated by the measurement of volume for at least 20 shaped abrasive particles of the same type. In other instances, the precursor shaped abrasive particles 243 can have a volume that is not greater than about 92%, not greater than about 90%, not greater than about 85%, such as not greater than about 80%, not greater than about 75%, not greater than about 60%, or even not greater than about 50% of the volume of the precursor shaped abrasive particles 240. Still, in one non-limiting embodiment, the precursor shaped abrasive particles 243 can have a volume that is at least about 10%, such as at least about 20%, at least about 30%, or even at least about 40% of the volume of the precursor shaped abrasive particles 240. The difference in volume between the precursor shaped abrasive particles 243 and precursor shaped abrasive particles 240 can be within a range between any of the minimum and maximum percentages noted above.

Another type of precursor shaped abrasive particles 242 may be formed in the same sectioning process used to form the precursor shaped abrasive particles 240 and 243 from the sheet 111. Notably, the precursor shaped abrasive particles 242 can have a quadrilateral two-dimensional shape as viewed in a plane defined by the width (w) and length (l) of the sheet 111. According to one particular embodiment, the precursor shaped abrasive particles 242 may have a two-dimensional shape of a parallelogram. It will be appreciated that the precursor shaped abrasive particles 242 can have a difference in volume as compared to the other precursor shaped abrasive particles as described in other embodiments herein.

The sectioning process may create another type of shaped abrasive particle 244 used to form the precursor shaped abrasive particles 240, 242, and 243 from the same sheet 111. Notably, the precursor shaped abrasive particles 244 can have a different two-dimensional polygonal shape as compared to the precursor shaped abrasive particles 240, 242, or 243. As illustrated in the embodiment of FIG. 2, the precursor shaped abrasive particles 244 can have a quadrilateral shape, and more particularly, a trapezoidal shape, as viewed in a plane defined by the width (w) and length (l) of the sheet 111. It will be appreciated that the precursor shaped abrasive particles 244 can have a difference in volume as compared to the other precursor shaped abrasive particles as described in other embodiments herein.

Figure 3:
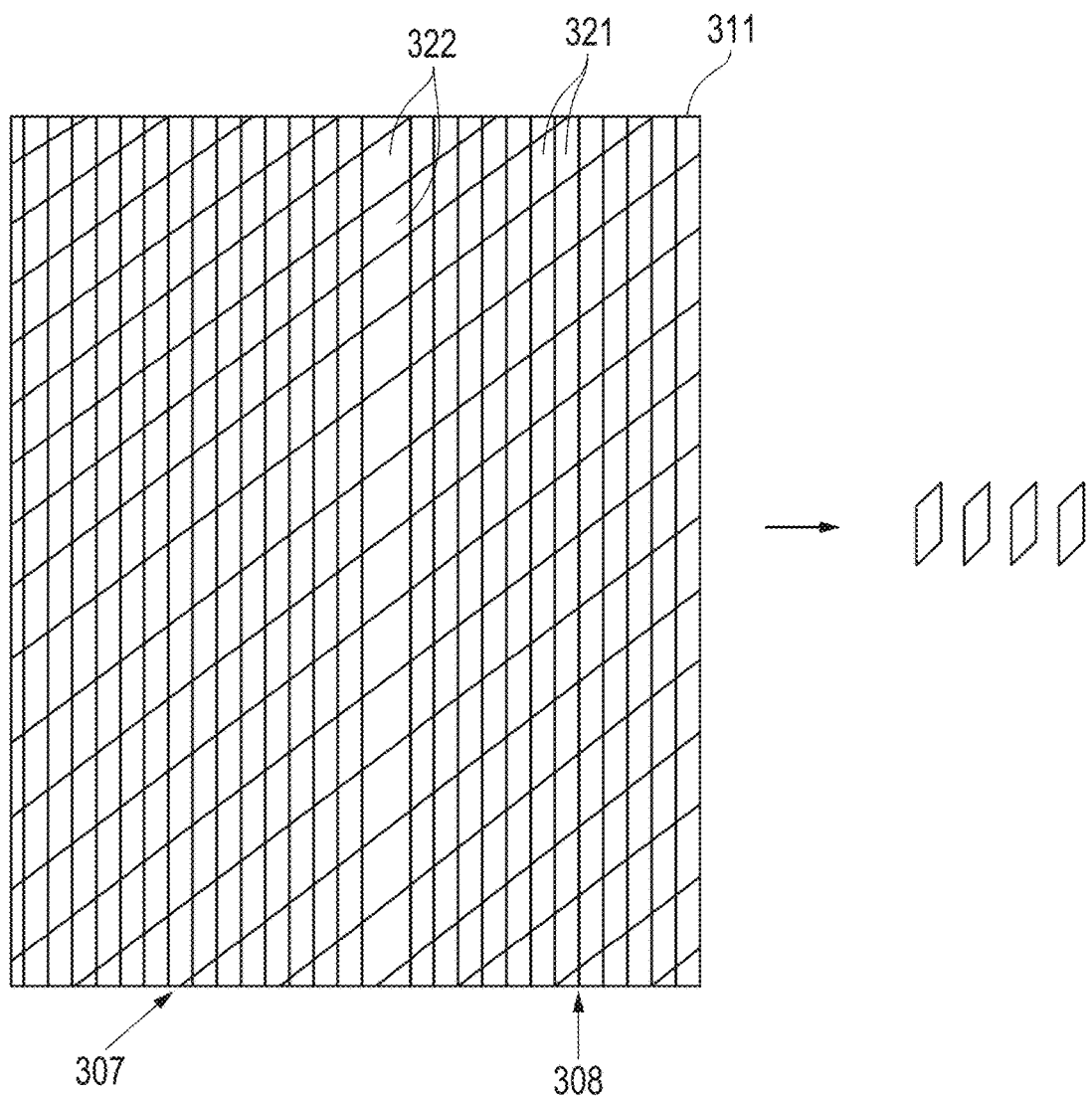
FIG. 3 includes an illustration of a form after sectioning in accordance with an embodiment.

FIG. 3 includes an illustration of a portion of a sheet 111 after a sectioning process in accordance with an embodiment. Notably, the sheet 111 can be cut in a first direction 308, and subsequently cut in a second direction 307 at an angle relative to the first direction 308. The sectioning process can create precursor shaped abrasive particles 321 having a generally quadrilateral polygonal shape as viewed in the plane defined by the length and width of the sheet 111. Furthermore, depending upon the sectioning process, a different type of precursor shaped abrasive particles 322 can be created in the same sectioning process used to create the precursor shaped abrasive particles 321. Notably, the precursor shaped abrasive particles 322 can be a different as compared to the precursor shaped abrasive particles 321 in terms of two-dimensional shape, size, and a combination thereof. For example, the precursor shaped abrasive particles 322 can have a greater volume as compared to the precursor shaped abrasive particles 321.

Referring again to FIG. 1, after forming precursor shaped abrasive particles 123, the particles may be translated through a post-forming zone 125. Various processes may be conducted in the post-forming zone 125, including for example, heating, curing, vibration, impregnation, doping, and a combination thereof.

In one embodiment, the post-forming zone 125 includes a heating process, wherein the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above.

Furthermore, the precursor shaped abrasive particles 123 may be translated through a post-forming zone at a particular rate, such as at least about 0.2 feet/min and not greater than about 8 feet/min.

Furthermore, the drying process may be conducted for a particular duration. For example, the drying process may be not greater than about six hours.

After the precursor shaped abrasive particles 123 are translated through the post-forming zone 125, the particles may be removed from the belt 109. The precursor shaped abrasive particles 123 may be collected in a bin 127 for further processing.

In accordance with an embodiment, the process of forming shaped abrasive particles may further comprise a sintering process. For certain processes, sintering can be conducted after collecting the precursor shaped abrasive particles 123 from the belt 109. Alternatively, the sintering may be a process that is conducted while the precursor shaped abrasive particles 123 are on the belt. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

While the system 100 has been illustrated as having a certain arrangement of processes associate with certain zones, it will be appreciated that such processes can be completed in different orders. Moreover, while certain processes have been described as associate with certain zones through which the belt 109 traverses, the processes do not necessarily need to be implemented in a conveyor assembly manner as illustrated. Any of the processes herein may be completed separate from the system 100.

Figure 4A:
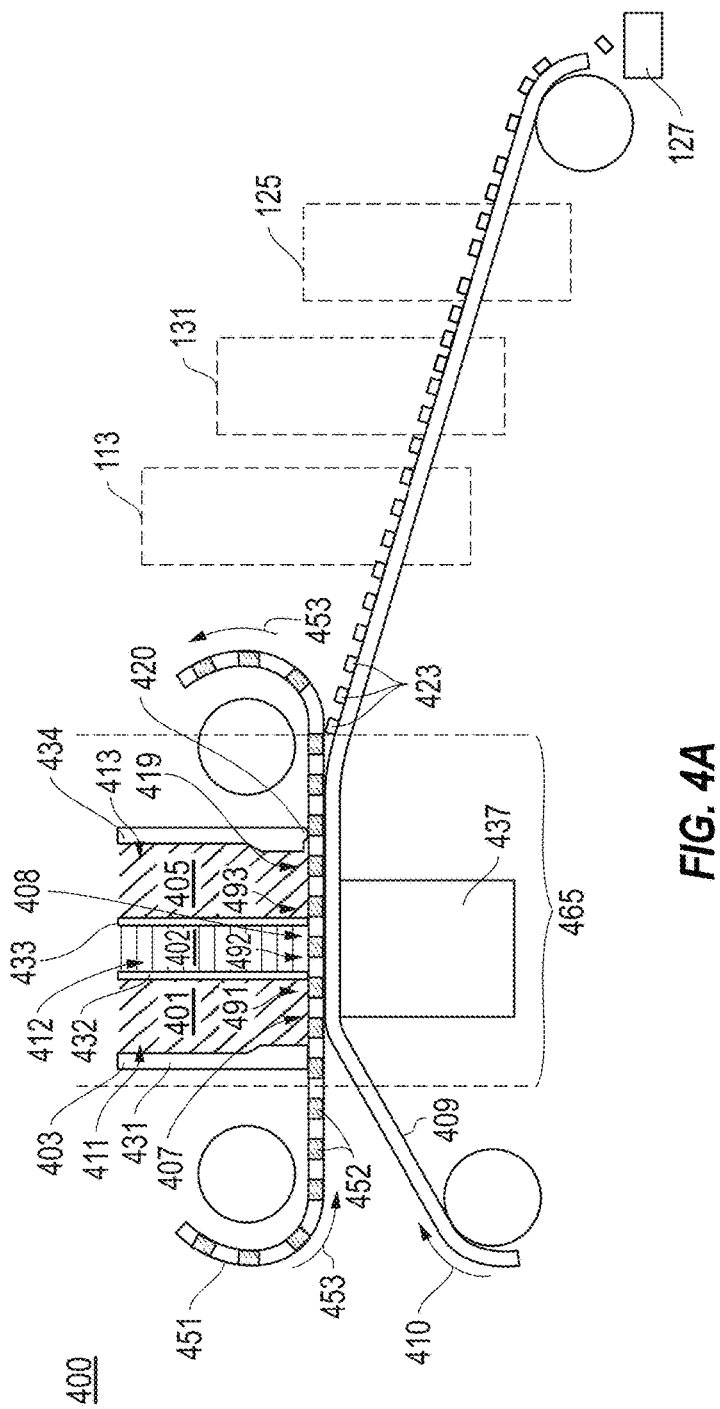
FIG. 4A includes an illustration of a system for forming a particulate material in accordance with an embodiment.

FIG. 4A includes a schematic of a system that may be used in the formation of composite precursor shaped abrasive particles in accordance with another embodiment. In particular instances, the system 400 may be referred to generally as a screen printing process for forming composite precursor shaped abrasive particles. In accordance with an embodiment, the system 400 can include a screen 451 configured to be translated in a direction 453 and having openings 452 configured to receive material extruded from the die 403 as the screen 451 passes underneath. As further illustrated, the system 400 can include a belt 409 configured to be translated in direction 410 and travel underneath the die 403 within the application zone 465. The system 400 can include a die 403 including multiple reservoirs for the delivery of different mixtures into the openings 452 of the screen 451 facilitating the formation of composite precursor shaped abrasive particles. Notably, in the printing process, the material can be extruded from the die 403 and through opening 452 in the screen and onto the belt 409.

In accordance with an embodiment, the die 403 can include a reservoir 411 configured to contain a first mixture 401. As further illustrated, the mixture 401 may be placed under a force (or pressure) to facilitate extrusion of the first mixture 401 in a direction 491 through the die opening 407. The first mixture 401 can have any characteristics of any mixtures described in the embodiments herein. In a particular instance, the reservoir 411 can be defined as a volume between a first wall 431 and a second wall 432.

As further illustrated, the die 403 can include a second reservoir 412 configured to contain a second mixture 402 within the volume defined between a wall 432 and a wall 433. In particular instances, the second mixture 402 may be extruded from the reservoir 412 in a direction 492 through the die opening 408 by applying a force (or pressure) to the second mixture 402. The second mixture 402 can have any characteristics of any mixtures described in the embodiments herein. Notably, the second mixture 402 can be different than or the same as the first mixture 401.

As further illustrated, the die 403 may include a reservoir 413 defined as a volume between wall 433 and wall 434. In accordance with an embodiment, the third mixture 405 may be extruded from the reservoir 413 by applying a force (or pressure) to the third mixture 405 and extruding the third mixture 405 in a direction 493 through the die opening 419. The third mixture 403 can have any characteristics of any mixtures described in the embodiments herein. Notably, the third mixture 403 can be different than or the same as the first mixture 401. Moreover, the third mixture 403 can be different than or the same as the second mixture 402.

During operation, the die can be operated such that the first mixture 401 can be extruded through the first die opening 407 and onto the screen 451. In particular instances, at least a portion of the first mixture 401 may be extruded into the openings 452 of the screen 451, and more particularly, through the openings 452 of the screen 451 and onto the belt 409. Furthermore, during operation, the second mixture 402 may be extruded from the reservoir 412 onto the screen 451. In particular instances, at least a portion of the second material 402 extruded from the die opening 408 and onto the screen 451 may fill the openings 452 within the screen. Notably, the process may be conducted such that the first material 401 and second material 402 are extruded simultaneously through respective die openings 407 and 408.

Furthermore, during operation, the third material 405 may be extruded from the reservoir 413 and through the die opening 493 onto the screen 451. In particular instances, the third material 405 may be extruded through the die opening 419 and onto the screen 451, such that the openings 452 are at least partially filled with the third material 405.

As will be appreciated, the system can be utilized such that at least the first mixture 401 and second mixture 402 may be simultaneously extruded into the openings 452 of the screen 451. Furthermore, it will be appreciated that while the die 403 is illustrated as having individual reservoirs 411, 412, and 413 that are longitudinally displaced from each other, other arrangements between reservoirs and die openings are contemplated. For example, in an alternative embodiment the first die opening 407 and second die opening 408 may be coaxially arranged with respect to each other. Furthermore, a third die opening, such as die opening 419 may also be arranged coaxially with respect to the first die opening 407 and second die opening 408.

Figure 4B:
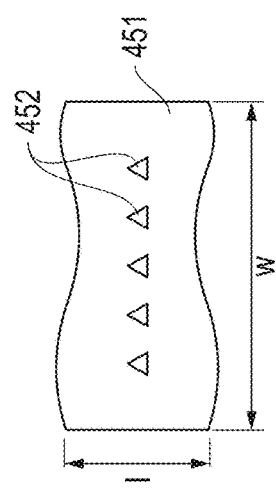
FIG. 4B includes an illustration of a portion of the system used in forming the particulate material in accordance with an embodiment.

Referring briefly to FIG. 4B, a portion of a screen 451 is illustrated. As shown, the screen 451 can include an opening 452, and more particularly, a plurality of openings 452 extending through the volume of the screen 451. In accordance with an embodiment, the openings 452 can have a two-dimensional shape as viewed in a plane defined by the length (l) and width (w) of the screen that include various shapes, for example, polygons, ellipsoids, numerals, Greek alphabet letters, Latin alphabet letters, Russian alphabet characters, complex shapes including a combination of polygonal shapes, and a combination thereof. In particular instances, the openings 452 may have two-dimensional polygonal shapes such as, a triangle, a rectangle, a quadrilateral, a pentagon, a hexagon, a heptagon, an octagon, a nonagon, a decagon, and a combination thereof.

After forcing the mixtures 401, 402, and 403 through their respective die openings 407, 408, and 419 and through the openings 452 in the screen 451, precursor shaped abrasive particles 423 may be printed on the belt 409 disposed under the screen 451. According to a particular embodiment, the precursor shaped abrasive particles 423 can have a shape substantially replicating the shape of the openings 452, and at least a two-dimensional shape substantially replicating the shape of the openings 452 as viewed in a plane defined by the length and width of the screen. Notably, the mixtures 401, 402, and 403 can be combined in the openings 452 and forced through the screen in rapid fashion, such that the average residence time of the mixtures 401, 402, and 403 within the openings 452 can be less than about 2 minutes, less than about 1 minute, less than about 40 second, or even less than about 20 seconds. In one non-limiting embodiment, the mixtures 401, 402, and 403 may be substantially unaltered during printing as they travel through the screen openings 452, and more particularly, may experience no appreciable loss of volatile materials or drying in the openings 452 of the screen 451.

During operation, the screen 451 can be translated in a direction 453 while the belt 409 can be translated in a direction 410 substantially similar to the direction 423 to facilitate a continuous printing operation. As such, the precursor shaped abrasive particles 423 may be printed onto the belt 409 and translated along the belt 409 to undergo further processing. It will be appreciated that further processing can include processes described in the embodiments herein, including for example, shaping, applying a dopant material, drying, sintering, and the like. In fact, as illustrated, the precursor shaped abrasive particles 423 may be translated through a shaping zone 113, wherein at least one exterior surface of the precursor shaped abrasive particles 423 may be shaped as described in embodiments herein. The precursor shaped abrasive particles 423 may be translated through an application zone 131, wherein a dopant material can be applied to at least one exterior surface of the particles. And further, the precursor shaped abrasive particles 423 may be translated on the belt 409 through a post-forming zone 425, wherein a variety of processes, including for example, drying, may be conducted on the precursor shaped abrasive particles 423 as described in embodiments herein.

While certain foregoing embodiments have described a screen printing process using a screen, it will be appreciated that such screen printing processes may utilize multiple screens. For example, one screen printing process for the formation of composite shaped abrasive particles can include the use of a first screen, which is completely or partially filled with a first mixture, and provision of a second screen, which can be different than the first screen, and provision of a second mixture within the openings of the second screen. The second screen can be placed over the first screen or over precursor shaped abrasive particles formed from the first screen. The second mixture can be provided on the precursor shaped abrasive particles of the first mixture to form composite precursor shaped abrasive particles. It will be appreciated that the first screen and second screen can have, but need not necessarily utilize, different size openings, different two-dimensional shapes of openings, and a combination thereof.

Moreover, in certain instances, the first screen and second screen can be used at the same time as a composite screen to shape the first and second mixtures. Still, the first screen and second screen may be used in separate processes. For example, wherein the first mixture is provided in the first screen at a first time and the second mixture is provided in the second screen at a second time. As noted above the first time and second time may be simultaneous with each other, such as when the first screen and second screen are used at the same time to shape the first and second mixtures. Still, the first time and the second time may be different, such that the first mixture can be provided in the openings of the first screen first, and after the first mixture has been formed in the openings of the first screen, the second mixture can be provided on the first mixture. The second screen can be oriented on the first screen to facilitate alignment between the openings in the first screen and openings in the second screens to facilitate suitable delivery of the second mixture onto the first mixture contained in the openings of the first screen. Still, in an alternative embodiment, the first mixture may be first removed from the openings of the first screen to create precursor shaped abrasive particles of the first mixture. Thereafter, the precursor shaped abrasive particles of the first mixture can be oriented with respect to openings of the second screen, and the second mixture can be placed in the openings of the second screen and onto the precursor shaped abrasive particles of the first mixture to facilitate formation of composite precursor shaped abrasive particles including the first mixture and the second mixture.

Figure 5:
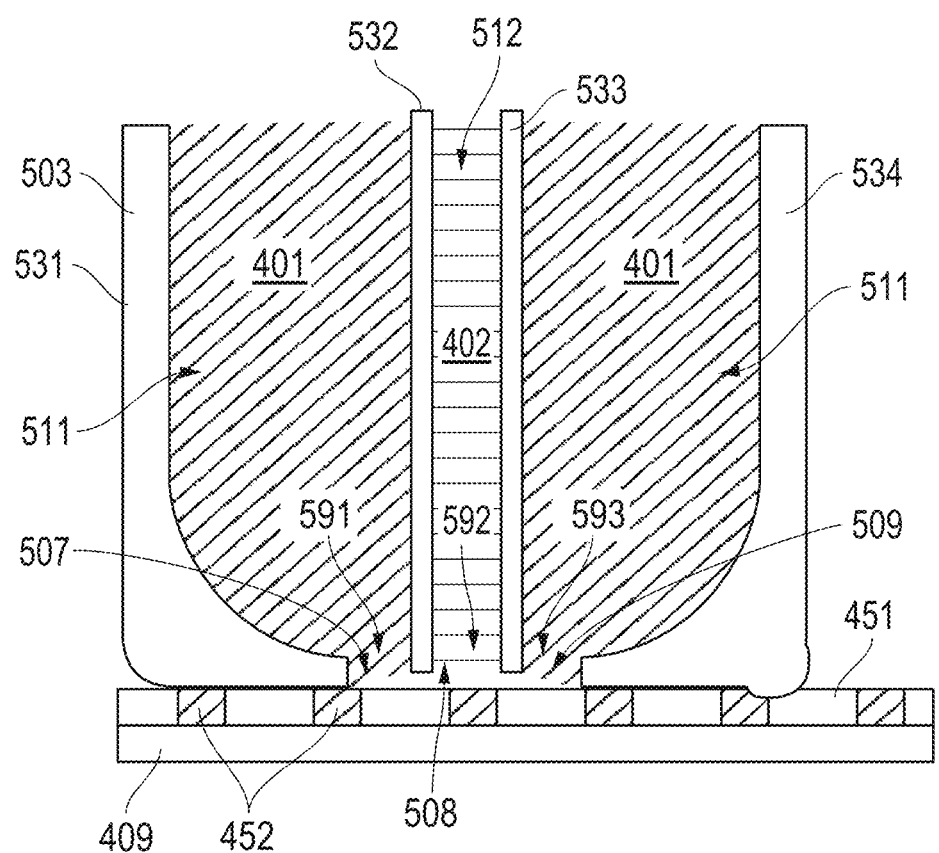
FIG. 5 includes an illustration of a portion of a system used for forming a particulate material in accordance with an embodiment.

FIG. 5 includes an illustration of a portion of a system for forming composite precursor shaped abrasive particles in accordance with an embodiment. Notably the die 503 can include a series of die openings that are arranged coaxially with respect to each other. For example, the die 503 can include a first reservoir 511 surrounding a second reservoir 512. In one embodiment, the reservoir 511 can be defined by an annular die opening 507. As further illustrated, the reservoir 512 can be defined between walls 532 and 533, configured to contain a second mixture 402 and be extruded in a direction 593 through a die opening 508. The die opening 508 can be disposed within the center of the annular die opening 507 of the first reservoir 511. The arrangement of die openings 507 and 508 with respect to each other may facilitate the formation of a particular type of composite precursor shaped abrasive particle which will be described in further embodiments herein. Notably, the die 503 represents an alternative arrangement of die openings 507 and 508 that may be used to deliver different mixtures in different arrangements to facilitate the formation of composite shaped abrasive particles having a particular arrangement of different materials within the body.

The processes of embodiments herein may incorporate the use of one or more dopant precursors that may facilitate the formation of dopants in the finally-formed shaped abrasive particles. A dopant precursor can be a material that has a first morphology and/or composition that is altered by one or more processes to form a corresponding dopant having a morphology or composition that is different than the dopant precursor. Moreover, a particular manner of providing the dopant precursor may facilitate particular placement and concentration of the corresponding dopant in the finally-formed shaped abrasive particle.

In certain aspects, one or more dopant precursors may be incorporated into one or more mixtures. Some suitable examples of dopant precursors can include organic materials, which may be in the form of compounds or complexing, including but not limited to, polymers. Moreover, some other suitable dopant precursors can include inorganic materials, such as compounds of oxides, carbides, nitrides, borides, oxycarbides, oxynitrides, salt compounds, and a combination thereof.

In one embodiment, one of the mixtures of the embodiments herein may include a dopant precursor that can be a discrete phase of material within the mixture. For example, the dopant precursor can be in the form of a particulate material, including but not limited to, a colloidal mixture.

The dopant precursor particulate material may also have a certain average particles size, including for example, an average particle size configured to form a dopant material in the shaped abrasive particle having an average size less than an average grain size of the shaped abrasive particle. In one particular embodiment, the dopant precursor particulate material can have an average particle size of not greater than about 200 microns, such as not greater than about 150 microns, not greater than about 100 microns, not greater than about 80 microns, not greater than about 50 microns, not greater than about 20 microns, or even not greater than about 10 microns. Still, in another non-limiting embodiment, the dopant precursor particulate material can have an average particle size of at least about 1 nm, such as at least about 10 nm, at least about 100 nm, or even at least about 500 nm. It will be appreciated that the dopant precursor particulate material can have an average particle size within a range between any of the minimum and maximum values noted above.

Alternatively, the dopant precursor may be in solution with the mixture, such as in the form of a solid solution. Some dopant precursors in the form of salts may be added to the mixture and form a solid solution with the phase of the mixture, as opposed to being a distinct phase.

It will be appreciated that a plurality of dopant precursors may be used in any combination. Additionally, more than one dopant precursor may be used with respect to one or more mixtures of the embodiments herein. In particular instances, different mixtures may include different contents of the same dopant precursor. Moreover, different mixtures may include different dopant precursors.

A shaped abrasive particle of an embodiment herein can have a body defined by a length (l), which can be the longest dimension of any side of the shaped abrasive particle, a width (w) defined as a longest dimension of the shaped abrasive particle through a midpoint of the shaped abrasive particle, and a thickness (t) defined as the shortest dimension of the shaped abrasive particle extending in a direction perpendicular to the length and width. In specific instances, the length can be greater than or equal to the width. Moreover, the width can be greater than or equal to the thickness.

Additionally, the body of the shaped abrasive particles can have particular two-dimensional shapes. For example, the body can have a two-dimensional shape as viewed in a plane define by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

The body of a shaped abrasive particle can be made of a ceramic material, including for example, an oxide, a nitride, a carbide, a boride, an oxycarbide, an oxynitride, and a combination thereof. In particular instances, the body can include alumina. More specifically, the body can consist essentially of alpha alumina.

Figure 6A:
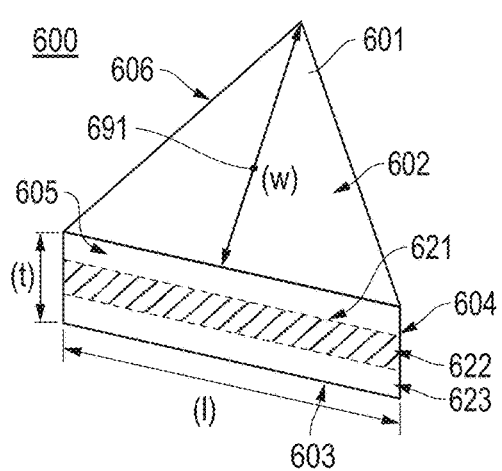
FIG. 6A includes a perspective view illustration of a shaped abrasive particle in accordance with an embodiment.

FIG. 6A includes a perspective view illustration of a composite shaped abrasive particle in accordance with an embodiment. As illustrated, the composite shaped abrasive particle 600 can have a body 601 including an upper major surface 602 and a bottom major surface 603 opposite the upper major surface 602. The upper major surface 602 and the bottom major surface 603 can be separated from each other by side surfaces 606, 605, and 604. As illustrated, the body 601 of the shaped abrasive particle 600 can have a triangular two-dimensional shape as viewed in a plane of the upper major surface 602 defined by the length and width of the body 601. In particular, the body 601 can have a length (l), a width (w) extending through a midpoint 691 of the body 601, and a thickness (t). In accordance with an embodiment, the body 601 can have a primary aspect ratio defined as a ratio of length:width. In certain instances, the primary aspect ratio of the body 601 can be at least about 1.2:1, such as at least about 1.5:1, at least about 2:1, at least about 3:1, or even at least about 4:1. Still, the primary aspect ratio may be not greater than about 100:1. It will be appreciated that the primary aspect ratio of the body 601 may be within a range between any of the minimum and maximum ratios noted above.

Furthermore, the body 601 may have a secondary aspect ratio defined by a ratio of length:thickness. In certain instances, the secondary aspect ratio of the body 601 may be at least about 1.2:1, such as at least about 1.5:1, at least about 2:1, at least about 3:1, at least about 4:1, at least about 5:1, or even at least about 10:1. Still, in at least one non-limiting embodiment, the body 601 can have a secondary aspect ratio that is not greater than about 100:1. It will be appreciated that the secondary aspect ratio may be within a range between any of the minimum and maximum ratios provided above.

Furthermore, the body 601 can have a tertiary aspect ratio defined by a ratio of the width:thickness. In certain instances, the tertiary aspect ratio of the body 601 may be at least about 1.2:1, such as at least about 1.5:1, at least about 2:1, at least about 3:1, at least about 4:1, at least about 5:1, or even at least about 10:1. Still, in at least one non-limiting embodiment, the body 601 can have a tertiary aspect ratio that is not greater than about 100:1. It will be appreciated that the tertiary aspect ratio may be within a range between any of the minimum and maximum ratios provided above.

The shaped abrasive particles of embodiments herein can have a particular size, as measured by the length of the body. For example, the shaped abrasive particles may have a median particle size of not greater than about 5 mm. Alternatively, the median particle may be less, such as not greater than about 4 mm, not greater than about 3 mm, not greater than about 2 mm, or even not greater than about 1.5 mm. In still another aspect, the median particle size of the shaped abrasive particles can be at least about 10 microns, at least about 100 microns, at least about 200 microns, at least about 400 microns, at least about 600 microns, or even at least about 800 microns. It will be appreciated that the median particle size of the shaped abrasive particles can be within a range between any of the above minimum and maximum values.

The shaped abrasive particles of embodiments herein can have a particular grain size, particularly for grains of alpha alumina. For example, the shaped abrasive particles may have an average grain size of not greater than about 500 microns, such as not greater than about 250 microns, or even not greater than about 100 microns, not greater than about 50 microns, not greater than about 20 microns, or even not greater than about 1 micron. In another aspect, the average grain size can be at least about 0.01 microns, such as at least about 0.05 microns, at least about 0.08 microns, or even at least about 0.1 microns. It will be appreciated that the average grain size of the shaped abrasive particles can be within a range between any of the above minimum and maximum values.

In certain instances, the composite shaped abrasive particles of the embodiments herein may include different materials within different regions of each body. More particularly, in certain instances, the composite shaped abrasive particles may comprise various concentrations of dopant in different regions within the body. For example, with respect to the composite shaped abrasive particle of FIG. 6A, the body 601 can comprise a layered structure. More particularly, the body may include a first layer 621, a second layer 622 underlying the first layer 621, and a third layer 623 underlying the second layer 622. In particular instances, the first layer 621 may be formed such that it defines a significant portion of the upper major surface 602, and more particularly essentially the entire surface of the upper major surface. Additionally, the third layer 623 may be formed such that it defines a significant portion of the body, including for example, the bottom major surface 603. In particular instances, the body 601 can be structured such that the third layer 623 forms essentially the entire area of the bottom major surface 603 of the body 601.

In particular instances, as illustrated, the body 601 can be formed such that the side surfaces, including 604, 605, and 606 may be formed of a combination of the first layer 621, the second layer 622, and the third layer 623. It will be appreciated that each of the layers 621, 622, and 623 may differ from each other in composition. In particular instances, the composition of the first layer 621 may differ from the composition of the second layer 622 by at least one element. In more particular instances, the composition of the first layer 621 may differ from the composition of the second layer 622 by the existence of a particular dopant material.

Suitable dopant materials for use in any of the layer 621, 622, or 623 can include an element or compound including an alkali element, alkaline earth element, rare earth element, hafnium, zirconium, niobium, tantalum, molybdenum, vanadium, and a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The body 601 can be formed such that any one of the layer 621, 622, and 623 can contain a particular amount of dopant, which may be based in part upon the dopant provided in the corresponding mixture forming the layer, or the amount of dopant in an adjacent layer. In particular instances, the amount of dopant within any of layers of the body 601 can be at least about 0.2 wt %, such as least about 0.6 wt %, at least about 1 wt %, at least about 1.4 wt %, at least about 1.8 wt %, at least about 2 wt %, at least about 2.5 wt %, at least about 3 w %, at least about 3.5 wt %, at least about 4 wt %, or even at least about 5 wt % for the total amount of dopant present within the layer. Still, according to one non-limiting embodiment, the total amount of dopant material in any of the layers 621, 622, and 623 can be not greater than about 30 wt %, such as not greater than about 26 wt %, not greater than about 24 wt %, not greater than about 20 wt %, not greater than about 18 wt %, or even not greater than about 16 wt % for the total weight of the layer. The amount of dopant within any one of the layers can be within a range between any of the minimum and maximum percentages noted above.

In another embodiment, the difference in dopant material concentration between any of the layers can be at least 5%, as defined by the equation $[(C1-C2)/C1] \times 100\%$, wherein C1 is the layer of higher concentration of dopant material and C2 is the layer of lower dopant material concentration. In other instances, the difference in concentration can be greater, such as at least about 10%, at least about 20%, at least about 30%, at least about 40%, at least about 50%, at least about 60%, at least about 70%, at least about 80%, or even at least about 90%. Still, in other instances, the difference may be not greater than about 100%, such as not greater than about 99%, not greater than about 95%, not greater than about 85%, not greater than about 75%, not greater than about 65%, not greater than about 55%, not greater than about 45%, not greater than about 35%, not greater than about 25%, not greater than about 15%, or even not greater than about 10%. It will be appreciated that the difference in dopant concentration between any of the layers can be within a range between any of the minimum and maximum percentages noted above.

In certain instances, the body 601 can have a central region including the geometric center 602 of the body 601. The central region may have a particularly low content of dopant material relative to other portions of the body 601, such as the exterior surfaces, such as the upper major surface 602 or bottom major surface 603. In certain instances, the central region of the body 601 can be essentially free of a dopant material. According to one particular embodiment, the body 601 can be formed such that a central region of the body 601 can have a first dopant concentration ($D_{1C}$) and a peripheral region of the body, which is spaced apart from the geometric center 691 of the body 601, can have a second dopant concentration ($D_{2C}$). In certain instances, the central region of the body 601 can be in the form of a layer and spaced apart from the upper major surface 602 and the bottom major surface 603 of the body 601. Still, the central region may intersect at least a portion of one of the side surfaces, such as side surface 604, 605, or 606. In the particular embodiment of FIG. 6A, the central region can be defined by the layer 622. As such, the central region can be spaced apart from the upper major surface 602 and the bottom major surface 603. Furthermore, the central region can be disposed between the peripheral region defined by layer 621 and the peripheral region defined by 623. That is, the central region can be at least partially underlying the peripheral region 621 and partially overlying the peripheral region defined by layer 623.

For at least one embodiment, the peripheral region can intersect a major surface of the body 601 such as the upper major surface 602, the bottom major surface 603, or the side surfaces 604, 605, or 606. It will be appreciated, that in particular instances, the peripheral region may intersect one or a combination of exterior surfaces of the body 601. In accordance with the composite shaped abrasive particle 600, the peripheral region can be defined by layer 621 or layer 623. As such, the peripheral region of the body 601 can include layer 621 intersecting the upper major surface 602, and side surfaces 604, 605, and 606 of the body 601. Additionally, the body 601 can have a second peripheral region defined by the layer 623 and intersecting the bottom major surface 603 and side surfaces 604, 605, and 606 of the body 601.

In accordance with another embodiment, the central region can be formed to have a first dopant concentration that is different than the second dopant concentration of a peripheral region within the body. In certain instances, the first dopant concentration can be greater than the second dopant concentration. Still in other instances, the second dopant concentration may be greater than the first dopant concentration. In accordance with at least one embodiment, the body can have a first dopant concentration that is different than a second dopant concentration and thus defining a dopant concentration difference. In certain instances, the dopant concentration difference can be at least about 0.2 wt % as measured by the difference in wt % of dopant material for the total weight of the body. In still other instances, the dopant concentration difference can be greater, such as at least about 0.4 wt %, at least about 0.6 wt %, at least about 1 wt %, at least about 1.4 wt %, or even at least about 1.8 wt %. Still, the dopant concentration difference may be not greater than about 30 wt %, such as not greater than about 20 wt %, not greater than about 15 wt %, such as not greater than about 12 wt %, not greater than about 11 wt %, not greater than about 10 wt %, not greater than about 8 wt %, or even not greater than about 6 wt %. It will be appreciated that the dopant concentration difference can be within a range between any of the minimum and maximum percentages noted above. It will further be appreciated that the total amount of dopant in any region, such as the peripheral region or central region can be within a range between any of the above minimum and maximum percentages.

Figure 6B:
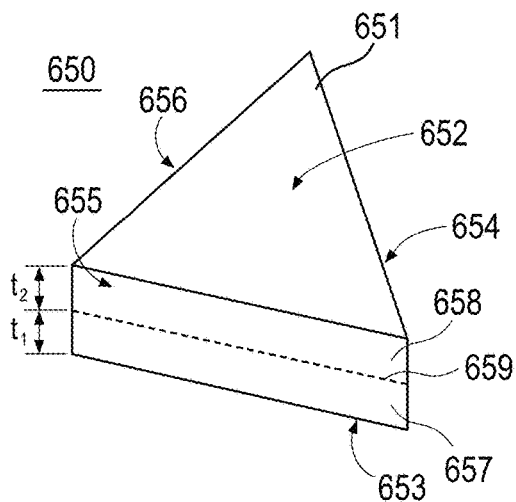
FIG. 6B includes a perspective view illustration of a shaped abrasive particle in accordance with an embodiment.

FIG. 6B includes a perspective view illustration of a composite shaped abrasive particle in accordance with an embodiment. As illustrated, the composite shaped abrasive particle 650 can have a body 651 including an upper major surface 652 and a bottom major surface 653 opposite the upper major surface 652. The upper major surface 652 and the bottom major surface 653 can be separated from each other by side surfaces 654, 655, and 656. The body 651 of the shaped abrasive particle 650 can have a triangular two-dimensional shape as viewed in a plane of the upper major surface 652 defined by the length and width of the body 651. In particular, the body 651 can have the features of aspect ratio, median particle size, and grain size, as described in the embodiment herein.

In certain instances, the composite shaped abrasive particles of the embodiments herein may include different materials within different regions of each body. More particularly, in certain instances, the composite shaped abrasive particles may comprise various concentrations of dopant in different regions within the body. For any embodiments herein, concentration can refer to weight percent or volume percent of the dopant material. The weight percent or volume percent can be based on the weight or volume of the entire body, particular region, or layer.

For example, with respect to the composite shaped abrasive particle of FIG. 6B, the body 651 can comprise a layered structure. The body may include a first layer 657 and a second layer 658 underlying the first layer 657. In particular instances, the first layer 657 may be formed such that it defines a significant portion of the bottom major surface 653, and more particularly, can essentially define the entire exterior surface of the bottom major surface 653. Additionally, in one embodiment, the second layer 658 can defines a significant portion of the body 651, including for example, the upper major surface 652. In particular instances, the body 651 can be structured such that the second layer 658 forms at least a portion of the area of the upper major surface 652 of the body 651. In one particular embodiment, the first layer 657 can be in direct contact with the second layer 658.

The first layer 657 can have a substantially planar structure extending for the entire length and width of the body 651 and defining a substantial portion of the exterior surfaces of the body 651. Additionally, the second layer 658 can have a substantially planar structure extending for the entire length and width of the body 651 and defining a substantial portion of the exterior surfaces of the body 651.

In particular instances, as illustrated, the body 651 can be formed such that the side surfaces, including 654, 655, and 656 may be formed of a combination of the first layer 657 and the second layer 658. As illustrated, the body 651 can be formed such that the first layer 657 can have a first thickness (t1) and the second layer 658 can have a second thickness (t2). In particular embodiments, the first thickness and the second thickness can be substantially the same. In still other instances, the first thickness and the second thickness can be substantially different. For example, the first thickness and the second thickness can be different from each other by at least about 5%, at least about 10%, at least about 20%, or even at least about 30%. Still, in one non-limiting embodiment, the first thickness and the second thickness can be different from each other by not greater than about 90%, such as not greater than about 80%, not greater than about 70%, not greater than about 50%. It will be appreciated that the difference in thickness between the first thickness and the second thickness can be within a range between any of the above minimum and maximum percentages.

According to one embodiment, the first thickness can be at least about 5% of the average thickness of the body. In other instances, the first thickness can be greater, such as at least about 10%, at least about 20%, at least about 30%, at least about 40%, or even at least about 50. In one non-limiting embodiment, the first thickness can be not greater than about 99%, such as not greater than about 90%, not greater than about 80%, not greater than about 70%, not greater than about 60%, not greater than about 50%, not greater than about 40%, or even not greater than about 30% of the average thickness of the body. It will be appreciated that the first thickness can be within a range between any of the minimum and maximum percentages noted above. Moreover, the second thickness can have the same attributes of the first thickness with respect to the average thickness of the body. Also, other additional layers, such as an intermediate layer, can have the same features.

It will be appreciated that each of the layers 657 and 658 may differ from each other in composition. In particular instances, the composition of the first layer 657 may differ from the composition of the second layer 658 by at least one element. In more particular instances, the composition of the first layer 657 may differ from the composition of the second layer 658 by at least one dopant material or even a plurality of dopant materials.

Suitable dopant materials for use in any of the layers 657 and 658 can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The body 651 can be formed such that any one of the layers 657 and 658 can contain a different amount of dopant with respect to each other. In certain instances, the first layer 657 can include a central region of the body 651 including the geometric center 602 of the body 601. In other embodiments, the second layer 658 may include a peripheral region of the body 651. According to one embodiment, the first layer 657 can have can have a first dopant concentration ($D_{1C}$) and the second layer can have a second dopant concentration ($D_{2C}$). In accordance with another embodiment, the first layer 657 can have a first dopant concentration that is different than the second dopant concentration of the second layer 658 within the body. In certain instances, the first dopant concentration can be greater than the second dopant concentration. Still in other exemplary bodies, the second dopant concentration may be greater than the first dopant concentration. In accordance with at least one embodiment, the body 651 can have a first dopant concentration that is different than a second dopant concentration and thus defining a dopant concentration difference (ΔDc).

In particular instances, the dopant concentration difference (ΔDc) between the two layers 657 and 658 of the body 651 can be at least about 0.2 wt %, such as least about 0.6 wt %, at least about 1 wt %, at least about 1.4 wt %, at least about 1.8 wt %, at least about 2 wt %, at least about 2.5 wt %, at least about 3 w %, at least about 3.5 wt %, at least about 4 wt %, or even at least about 5 wt % for the total amount of dopant present within the body 651. Still, according to one non-limiting embodiment, the total difference in the amount of dopant material between any one of the layers 657 and 658 can be not greater than about 30 wt %, not greater than about 26 wt %, not greater than about 24 wt %, not greater than about 20 wt %, not greater than about 18 wt %, or even not greater than about 16 wt % for the total weight of the body. The difference in the amount of dopant material between any one of the layers can be within a range between any of the minimum and maximum percentages noted above. As noted herein, while the foregoing weight percentages are recited as based upon the weight of the body, it will be appreciated that the same percentages can be based upon the weight of corresponding layers. For example, if the first layer 657 had 5 wt % of a dopant for the total weight of the layer and the second layer 658 had 2 wt % of the same dopant for the total weight of the layer, the weight percent difference between the two layers could be calculated as 3 wt %.

In another embodiment, the difference in dopant material concentration between the layers 657 and 658 layers can be at least 5%, as defined by the equation [(C1−C2)/C1]×100%, wherein C1 is the layer of higher concentration of dopant material and C2 is the layer of lower dopant material concentration. In other instances, the difference in concentration can be greater, such as at least about 10%, at least about 20%, at least about 30%, at least about 40%, at least about 50%, at least about 60%, at least about 70%, at least about 80%, or even at least about 90%. Still, in other instances, the difference may be not greater than about 100%, such as not greater than about 99%, not greater than about 85%, not greater than about 75%, not greater than about 65%, not greater than about 55%, not greater than about 45%, not greater than about 35%, not greater than about 25%, not greater than about 15%, or even not greater than about 10%. It will be appreciated that the difference in dopant concentration between any of the layers can be within a range between any of the minimum and maximum percentages noted above.

According to one embodiment, the second layer 658 can include a second dopant including zirconium. More particularly, the second dopant may include zirconia, and more particularly, can consist essentially of zirconia. For certain embodiments, the second layer 658 can include a greater content of zirconia than a content of zirconia in the first layer 657. In another embodiment, the dopant concentration difference of zirconia between the first layer 657 and the second layer 658 can be at least about 0.2 wt %, such as least about 0.5 wt %, at least about 1 wt %, at least about 1.4 wt %, at least about 1.8 wt %, or even at least about 2 wt %. Still, according to one non-limiting embodiment, the total difference in the amount of dopant material between any one of the layers 657 and 658 can be not greater than about 50 wt %, such as not greater than about 30 wt %, not greater than about 25 wt %, not greater than about 20 wt %, not greater than about 15 wt %, or even not greater than about 12 wt % for the total weight of the body. The difference in the amount of zirconia dopant material between the first layer 657 and the second layer 658 can be within a range between any of the minimum and maximum percentages noted above.

According to one particular aspect, the first layer 657 can include a first dopant that is different than a second dopant within the second layer 658, and more particularly, the first layer 657 may be essentially free of the second dopant material present in the second layer 658. Likewise, in certain instances, the second layer 658 can be include a second dopant that is different than a first dopant within the first layer 657, and more particularly, the second layer 658 may be essentially free of the first dopant material present in the first layer 657.

Still, in other embodiments, a dopant may diffuse from one adjacent layer into another during processing. In particular, controlled processing may facilitate the controlled diffusion of a dopant between layers, such that controlled delivery of a dopant material initially present in a single layer may be transmitted to one or more adjacent layers to form a suitable composite shaped abrasive particle having particular contents of dopants, or even exhibit step function diffusion boundaries.

Figure 20A:
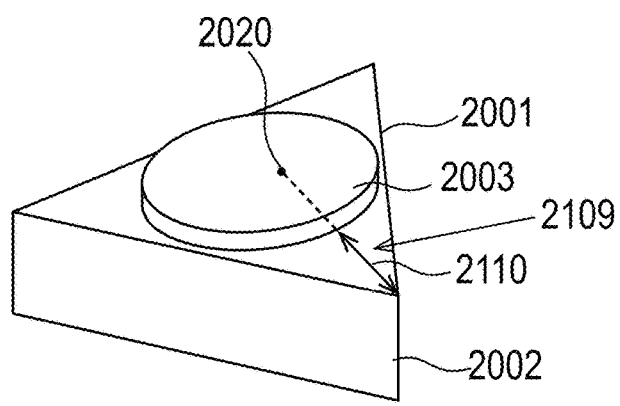
FIG. 20A includes a perspective view of a shaped abrasive particle according to an embodiment.

While the body 651 illustrated includes a first layer 657 having a generally triangular two-dimensional shape and a second layer 658 overlying the first layer 657 and having a substantially similar triangular two-dimensional shape, it will be appreciated that the composite bodies of the embodiments herein can include multiple layers, wherein each of the layers can have different two-dimensional shapes with respect to each other. For example, as illustrated in FIG. 20A, a shaped abrasive particle can be formed to have a body 2001 including a first layer 2002 having a first two-dimensional shape as viewed in a plane defined by a length and a width of the body 2001 and a second layer 2003 overlying the first layer 2002 having a second two-dimensional shape. In particular, as illustrated, the first layer 2002 can have a generally polygonal two-dimensional shape and the second layer 2003 can have a generally elliptical or circular two-dimensional shape.

Figure 20B:
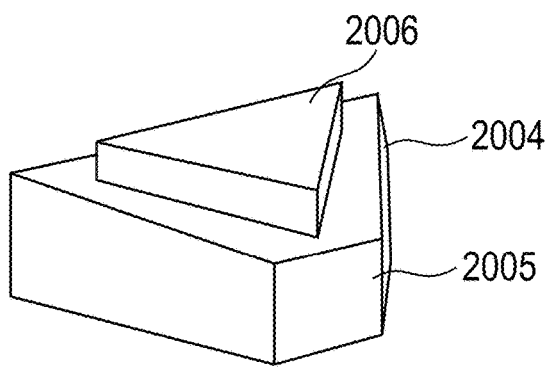
FIG. 20B includes a perspective view of a shaped abrasive particle according to an embodiment.

FIG. 20B includes an illustration of another embodiment including a shaped abrasive particle 2004 including a first layer 2005 having a first two-dimensional shape and a second layer 2006 having a second two dimensional shape. FIGS. 20A and 20B are exemplary, and it will be appreciated that the shaped abrasive particles of the embodiments herein can included a plurality of layers including a variety of different two-dimensional shapes, including but not limited to polygons, ellipsoids, numerals, Greek alphabet characters, Latin alphabet characters, Russian alphabet characters, complex shapes having a combination of polygonal shapes, corner-truncated shapes, and a combination thereof, wherein the body comprises a polygonal shape as viewed in a plane defined by the dimension of the length and width, wherein the body comprises a polygonal shape selected from the group of triangle, rectangle, quadrilateral, pentagon, hexagon, heptagon, octagon, nonagon, decagon, and a combination thereof. The foregoing includes corner truncated shapes, wherein at least a portion of the feature of a corner is missing or altered in shape, which may be a result of certain processing techniques.

Moreover, as evident in FIGS. 20A and 20B, shaped abrasive particles including a combination of layers, wherein each of the layers can have different two-dimensional shapes with respect to each other and may also have different dimensional features for any one of the dimensions of the layers. Provision such shaped abrasive particles may facilitate alternative or improved deployment of the particles in an abrasive article and may further facilitate improved performance or use of the abrasive article. For example, the two-dimensional shape of the first layer 2002 can have an average length (or diameter) that is significantly different than an average length (or diameter) of the two-dimensional shape of the second layer 2003. Moreover, the two-dimensional shape of the first layer 2002 can have an average width that is significantly different than the average width of the two-dimensional shape of the second layer 2003. Additionally, the two-dimensional shape of the first layer 2002 can have an average thickness that is significantly different than an average thickness of the two-dimensional shape of the second layer 2003.

As also illustrated in FIGS. 20A and 20B, each of the layers can have different areas or volumes with respect to each other. For example, the average area (e.g., average surface area of a major exterior surface) of the two-dimensional shape of the first layer 2002 can be significantly different than an average area of the two-dimensional shape of the second layer 2003. Additionally, the average volume of the two-dimensional shape of the first layer 2002 can be significantly different than an average volume of the two-dimensional shape of the second layer 2003. For example, the first layer 2002 can have a volume that is significantly greater than the volume of the second layer 2003, such that the first layer 2002 comprises a greater volume portion of the total volume of the body 2001 compared to the second layer 2003. Still, in alternative embodiments, the first layer 2002 can have a volume that is significantly less than a volume of the second layer 2003.

Referring again to FIG. 6B, the body may include a diffusion interface 659 disposed between the first layer 657 and the second layer 658. In one embodiment, the diffusion interface 659 can define a boundary of the first layer 657 and the second layer 658. Moreover, the diffusion interface 659 can separate the first layer 657 and the second layer 658. According to one embodiment, the body 651 can have a diffusion interface 659 defining a diffusion boundary between the first layer 657 and the second layer 658, wherein the concentration of at least one dopant on a first side of the diffusion interface 659 (e.g., within the first layer 657) can be significantly different than the concentration of the same dopant on the opposite side (e.g., within the second layer 658) of the diffusion interface 659. It will be appreciated that the diffusion interface 659 can define a boundary characterizing a difference in more than one dopant concentration between the first layer 657 and the second layer 658. In certain instances, the diffusion interface 659 can define a step function difference in a concentration of at least one dopant between the first layer 657 and the second layer 658, including for example, a step function difference in a concentration of a second dopant in the second layer 568 compared to a concentration of the second dopant in the first layer 657.

The diffusion interface 659 can extend for an entire area between the first layer 657 and the second layer 658. In certain instances, the diffusion interface 659 can extend for an entire length of the body 651. Moreover, the diffusion interface 659 can extend for an entire width of the body 651. It will be appreciated that the diffusion interface 659 may have a planar contour or alternatively, a curved, arcuate, or irregular contour. The shape and orientation of the diffusion interface 659 may depend in part upon the shape and orientation of the corresponding layers or portions that define the diffusion interface.

According to another aspect, a shaped abrasive particle having multiple portions, such as a first layer 657 and a second layer 658 can be formed such that one of the portions (or layers) can be in compression relative to a second, adjacent portion, and the second portion can be in tension relative to the corresponding and adjacent portion. For example, with respect to the shaped abrasive particle of FIG. 6B, the first layer 657 may be in compression relative to the second layer 658 and the second layer 658 may be in tension relative to the first layer 657. Alternatively, the second layer 658 may be in compression relative to the first layer 657.

The relative state of compression and tension in one or more portions (e.g., layers 657 and 658) of the body of a shaped abrasive particle may be controlled by selection of at least one of the shape, dimension, and composition of the portions relative to each other. In particular instances, the body of the shaped abrasive particle can be formed such that the difference in stress (or strain) between a first portion and a second portion is at least about 5%, such as at least about 10%, at least about 20%, at least about 30%, at least about 40%, at least about 50%, at least about 60%, at least about 70%, at least about 80% or even at least about 90%. Still, in another instance, the difference in stress (or strain) between a first portion and a second portion can be not greater than about 90%, such as not greater than about 80%, not greater than about 70%, not greater than about 60%, such as not greater than about 50%, not greater than about 40%, not greater than about 30%, such as not greater than about 20%, not greater than about 10%, or even not greater than about 5%. It will be appreciated that the difference in stress (or strain) between a first portion and a second portion in the body can be within a range between any of the minimum and maximum percentages noted above.

As noted herein, the body 651 may include additional portions or layers. For example, the body 651 may include at least one intermediate layer disposed between the first layer 657 and the second layer 658. The intermediate layer may have substantially the same composition as the first layer 657. Additionally, the intermediate layer may have substantially the same composition as the second layer 658. Alternatively, the intermediate layer can have a substantially different composition as compared to the composition of the first layer, which may include at least one difference in a dopant material. Likewise, the intermediate layer can have a substantially different composition as compared to the composition of the second layer, which may include a difference of at least one dopant material.

The intermediate layer may be disposed between the first layer 657 and the second layer 658 and define an additional diffusion interface, in addition to the diffusion interface described above. Accordingly, the body may have a first diffusion interface (e.g., a first intermediate diffusion interface) between the first layer and the intermediate layer and a second diffusion interface (e.g., a second intermediate diffusion interface between the intermediate layer and the second layer 658. All of the diffusion interfaces can have the properties of the diffusion interfaces described in accordance with embodiments herein.

Figure 7:
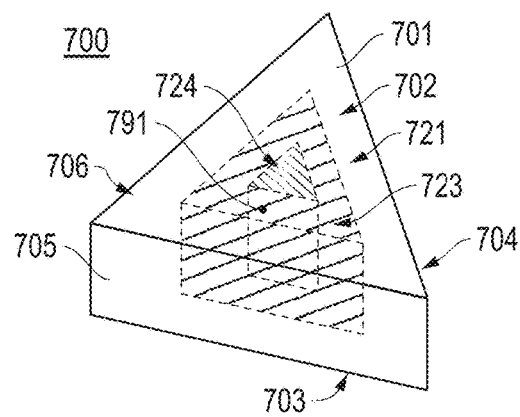
FIG. 7 includes a perspective view illustration of a shaped abrasive particle in accordance with an embodiment.

FIG. 7 includes a perspective view illustration of a shaped abrasive particle in accordance with an embodiment. The complex shaped abrasive particle 700 can include a body 701 having an upper major surface 702, a lower major surface 703 separated from the upper major surface 702 by side surfaces 704, 705, and 706. The composite shaped abrasive particle 700 represents an alternative arrangement of layers of composite material, and particularly a core-shell arrangement of different layers within the body 701. In accordance with one embodiment, the body 701 can include a first layer 721 intersecting the exterior side surfaces of the body including side surfaces 704, 705, and 706. In particular instances, the first layer 721 can intersect and define the exterior side surfaces 704, 705, and 706. As further illustrated, the first layer 721 can define at least a portion of the upper major surface 702 and the lower major surface 703. In fact, as illustrated, the first layer 721 can have a generally annular shape, wherein the second layer 723 and third layer 724 are disposed within an interior volume of the first layer 721.

As illustrated, the body can be formed such that a peripheral region, as defined by layer 721 can surround at least a portion of another layer defining another region, such as a central region of the composite shaped abrasive particle. Furthermore, the body 701 can include a second layer 723 disposed within an interior volume of the first layer 721. A portion of the second layer 723 may intersect the upper major surface 702. Additionally, a portion of the second layer 723 may intersect the bottom major surface 703. In fact, a portion of the second layer 723 may intersect and define a portion of the upper major surface 702 and lower major surface 703. Notably, the second layer 723 may be spaced apart from at least a portion of the exterior surface of the body, such as the exterior side surfaces 704, 705, and 706. In accordance with an embodiment, the second layer may define a central region having a composition that may differ from the composition of the first layer 721. In particular instances, the second layer 723 may define a central region of the body 701 having a dopant concentration differing from a dopant concentration within the first layer 721 as described in other embodiments herein. Moreover, the second layer 723 may define an intermediate layer between the first layer 721 and a third layer 724.

As further illustrated, the composite shaped abrasive particle 700 can include a body including a third layer 724 disposed within a volume of the second layer 723 and first layer 721. The third layer 724 may represent a central region and can include a geometric center of the body 704, which represents the volumetric midpoint of the body 701. In accordance with an embodiment, the third layer 724 can represent a central region that may be spaced apart from one or more exterior surfaces of the body, including for example the exterior side surfaces 704, 705, and 706. Additionally, the third layer 724 may represent a central region of the body 701 that can be intersecting and defining a portion of the upper major surface 702 and bottom surface 703. It will be appreciated however that the third layer 724 may not necessarily define and intersect any portions of the exterior surfaces of the body 701 and may be contained entirely within the interior volume spaced apart from any exterior surfaces.

In accordance with an embodiment, the body can include a central region that comprises a particular volume portion (volume %) of the total volume of the body as compared to the volume portion of a peripheral region. For example, the body 701 may contain a central region that comprises a smaller volume portion of the total volume of the body as compared to the volume portion of a peripheral region. Still, in alternative embodiments, the body 701 can be formed such that a central region can take up a greater volume portion of the total volume of the body as compared to a volume portion of a peripheral region.

Figure 8:
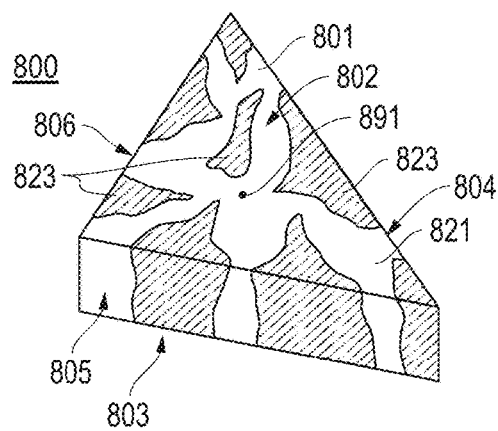
FIG. 8 includes a perspective view illustration of a shaped abrasive particle in accordance with an embodiment.

FIG. 8 includes a perspective view illustration of a composite shaped abrasive particle in accordance with an embodiment. As illustrated, the composite shaped abrasive particle 800 can include a body 801 having an upper major surface 802 and a lower major surface 803 spaced apart from the upper major surface 802 by side surfaces 804, 805, and 806. While forgoing embodiments have demonstrated peripheral regions and central regions having generally symmetrical shapes, it will be appreciated that alternative composite abrasive particles of the embodiments herein may utilize peripheral regions and central regions having non-symmetric shapes. For example, as illustrated in FIG. 8, the body can include a random arrangement of second layer portions 823 intersecting and defining various portions of the exterior surfaces, including the upper major surface 802, lower major 803, and side surfaces 804, 805, and 806. Furthermore, the body 801 can include a first layer 821 that can include a geometric center 891 of the body 801.

Additionally, the first layer 821 may be intersecting and defining various portions of the exterior surfaces of the body 801, including for example, the upper major surface 802, the lower major surface 803, and the side surfaces 804, 805, and 806. In particular instances, the first layer 821 may define a continuous phase or matrix extending throughout a majority of the volume of the body 801, wherein the second layer portions are present as dispersed and discrete regions spaced apart from each other. As such, in one particular embodiment, the first layer 821 may represent a central region of the body. Additionally, in certain instances, the second layer portions 823 may define peripheral regions of the body 801.

In accordance with an embodiment, the first layer 821 defining the central region of the body 801 can have a non-symmetric shape. The non-symmetric shape may be viewed in a plane defined by the length and width of the body 801, or alternatively, the width and thickness of the body 801. Furthermore, the body 801 can include second layers portions 823 defining peripheral regions, wherein the peripheral regions can have non-symmetric shapes. In particular instances, the peripheral regions as defined by the second layer portions 823 may have non-symmetrical shapes as viewed in a plane as defined by the length and width of the body 801 or in a plain defined by the width and thickness of the body 801.

FIG. 9 includes a cross-sectional illustration of a portion of a shaped abrasive particle in accordance with an embodiment. Notably, the shaped abrasive particle can include a body 901 having a bottom surface 904, an upper major surface 902 opposite the bottom surface 904, and a side surface 903 joining the bottom surface 904 and upper major surface 902. As further illustrated, the body 901 can include a side surface 905 opposite the side surface 903 joining the bottom surface 904 and upper major surface 902. In accordance with a particular embodiment, the body 901 can have a curvilinear upper major surface 902. Notably, in some instances, the upper major surface 902 can have a convex contour such that the thickness of the body 901 at the midpoint ($t_m$) is greater than the thickness at either one of the side surfaces ($t_s$) 903 or 905. For some embodiments, the bottom surface 902 may be substantially planer as compared to the upper major surface 902.

FIG. 10 includes a cross-sectional illustration of an alternative shaped abrasive particle in accordance with an embodiment. Notably, the shaped abrasive particle can have a body 1001 including a bottom surface 1004, an upper major surface 1002 opposite the bottom surface 1004, and side surfaces 1003 and 1005 opposite each other and joining the bottom surface 1005 and upper major surface 1002. As illustrated, the body 1001 can have a particularly unique contour, wherein the upper major surface 1002 has a convex contour, and the bottom surface 1004 also has a convex contour such that the thickness at the midpoint ($t_m$) is significantly greater than the thickness of the body 1001 at the edges ($t_e$) defined by surfaces 1001 and 1005.

FIG. 11 includes a cross-sectional illustration of an alternative shaped abrasive particle in accordance with an embodiment. Notably, the shaped abrasive particle can have a body 1101 including a bottom surface 1104, an upper major surface 1102 opposite the bottom surface 1104, and side surfaces 1103 and 1105 opposite each other and separating the bottom surface 1104 and upper major surface 1102. As illustrated, the body 1101 can have a unique contour, wherein the upper major surface 1102 can have a concave contour and the bottom surface 1104 can have a substantially planar contour such that the thickness at the midpoint ($t_m$) is significantly less than the thickness of the body 1101 at the edges ($t_e$) defined by surfaces 1101 and 1105.

FIG. 12 includes a cross-sectional illustration of an alternative shaped abrasive particle in accordance with an embodiment. Notably, the shaped abrasive particle can have a body 1201 including a bottom surface 1204, an upper major surface 1202 opposite the bottom surface 1204, and side surfaces 1203 and 1205 opposite each other and separating the bottom surface 1204 and upper major surface 1202. As illustrated, the body 1201 can have a unique contour, wherein the upper major surface 1202 can have a concave contour and the bottom surface 1204 can have a concave contour such that the thickness at the midpoint ($t_m$) is significantly less than the thickness of the body 1201 at the edges ($t_e$) defined by surfaces 1201 and 1205.

In accordance with an embodiment, the shaped abrasive particles of the embodiments herein may be formed such that at least two exterior surfaces have significantly different two-dimensional shapes with respect to each other. In particular, the shaped abrasive particles can have a bottom major surface having a two-dimensional shape that is significantly different from a two-dimensional shape of an upper major surface. In more particular embodiments, the two-dimensional shapes can be any one of the two-dimensional shapes noted in the embodiments herein. For example, the bottom surface can be a first polygonal shape and the upper major surface can be a different polygonal shape.

Figure 13:
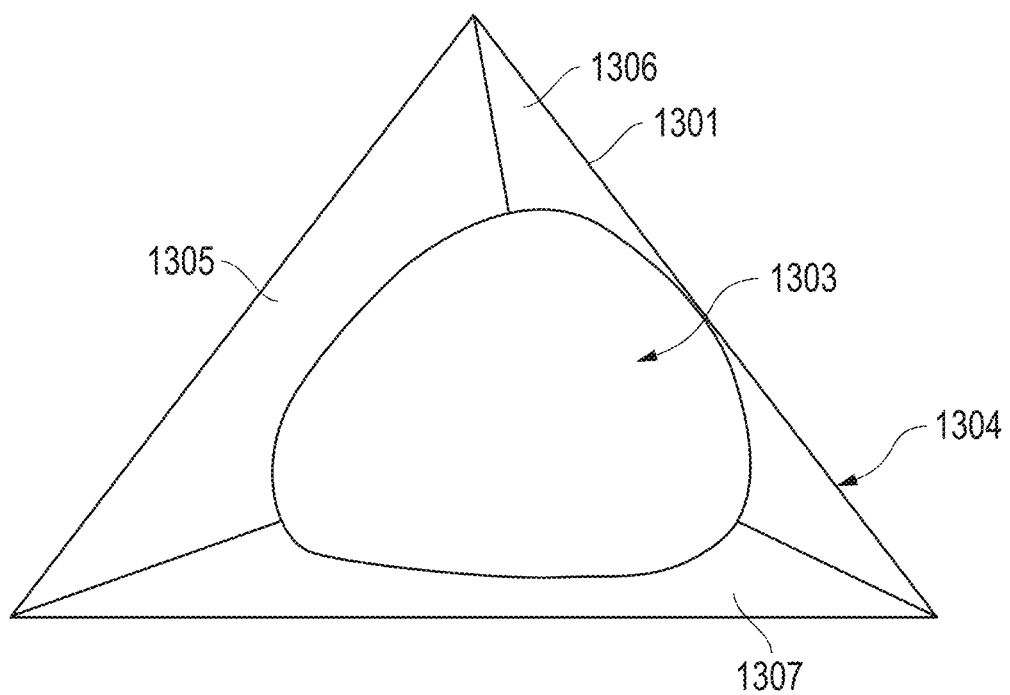
FIG. 13 includes a perspective view illustration of a shaped abrasive particle in accordance with an embodiment.

FIG. 13 includes a perspective view illustration of a shaped abrasive particle in accordance with an embodiment. The shaped abrasive particle 1300 includes a body 1301 having a bottom surface 1304 and an upper surface 1303 spaced away from the bottom surface 1304 by side surfaces 1305, 1306, and 1307. As illustrated in FIG. 13, the bottom surface 1304 can have a generally triangular shape, while the upper surface 1303 can have an ellipsoidal shape.

Figure 14A:
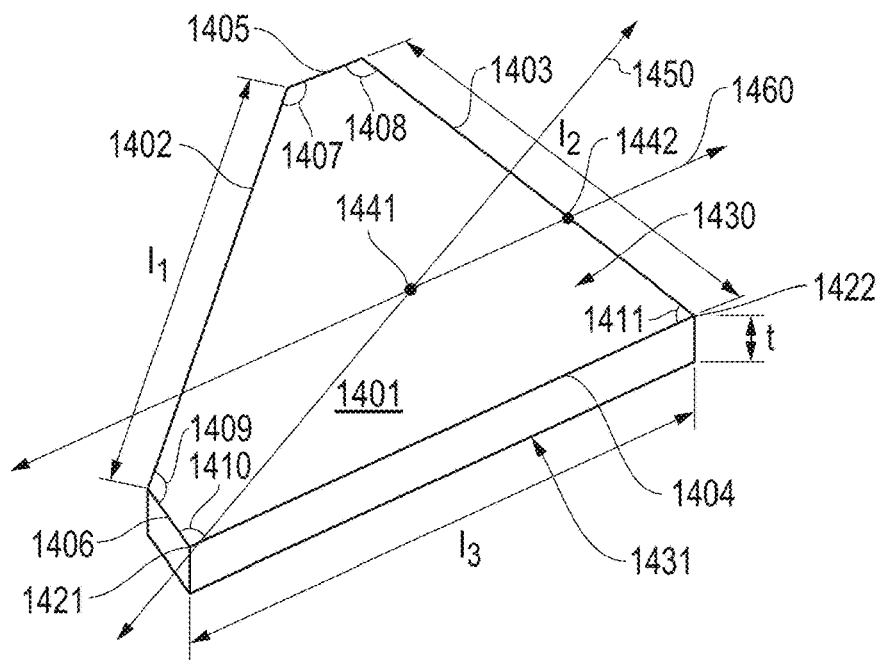
FIG. 14A includes a perspective view illustration of a particulate material in accordance with an embodiment.

FIG. 14A includes a perspective view illustration of a shaped abrasive particle in accordance with an embodiment. Notably, body 1401 can have a first long side 1402, a second long side 1403, and a third long side 1404. Furthermore, the body 1401 can include a first short side 1405 coupled to the first long side 1402 and second long side 1403. The body 1401 may further include a second short side 1406 coupled to the first long side 1402 and third long side 1404. While the body 1401 of the shaped abrasive particle may be considered to have a generally pentagon shape as viewed in a plane defined by the length and width, in particular instances, the body 1401 can be defined as a corner truncated triangle, wherein the first short side 1405 and second short side 1406 define flat surfaces where otherwise a corner, such as corner 1422, would exist. Notably, such corner-truncated shapes may represent a significant portion of shaped abrasive particles in a batch, formed through the process described herein.

As illustrated, the body 1401 can have a first angle 1407 defined between the first long side 1402 and first short side 1405 as viewed at the upper major surface 1430 of the body 1401. In accordance with an embodiment, the first angle 1407 can be greater than about 90°. In more particular instances, the first angle 1407 can be at least about 92°, at least about 95°, at least about 100°, or even at least about 105°. Still, the first angle, in one non-limiting embodiment, can be not greater than about 160°.

The body can further include a second angle 1408 formed between the first short side 1405 and second long side 1403 as viewed at the upper major surface 1430 of the body 1401. In accordance with an embodiment, the second angle 1408 can be the same as the first angle 1407. Still, in another embodiment, the second angle 1408 can be different than the first angle 1407. According to one instance, the second angle 1408 can be obtuse. Alternatively, the second angle 1408 may be greater than about 90°, and more particularly, at least about 92°, at least about 95°, at least about 100°, or even at least about 105°. Still, the second angle 1408, in one non-limiting embodiment, can be not greater than about 160°.

As further illustrated, the body 1401 of the shaped abrasive particle can include a third angle 1409 defined as the angle between the second short side 1406 and first long side 1402 as viewed at the upper major surface 1430 of the body 1401. The third angle 1409 may be the same as the first angle 1407 or the second angle 1408. Alternatively, the third angle 1409 may be different than the first angle 1407 and second angle 1408.

The body 1401 can also include a fourth angle 1410 defined as the angle between the second short surface 1406 and third long side 1404. The fourth angle 1410 may be different than the first angle 1407, second angle 1408, or third angle 1409. In particular instances, the fourth angle 1410 can be less than the first angle 1407, less than the second angle 1408, or less than the third angle 1409. In at least one particular embodiment, the fourth angle 1410 may be substantially orthogonal)(90°). In yet other instances, the fourth angle 1410 may be greater than 90°.

The body 1401 may further include a fifth angle 1411 between the third long side 1404 and second long side 1403 as viewed top down looking at the upper major surface 1430 of the body 1401. Notably, the fifth angle 1411 can be different than the first angle 1407, the second angle 1408, the third angle 1409, or the fourth angle 1410. In particular instances, the fifth angle 1411 can be less than the first angle 1407, less than the second angle 1408, less than the third angle 1409, or even less than the fourth angle 1410. The fifth angle 1411 can define the corner 1422 of a triangle, and thus be less than about 90°, and more particularly less than about 70°. While the body 1401 has been illustrated as having a first short side and a second short side 1406, it will be appreciated that the body could incorporate a third short side separating the second long side and third long side 1404.

In accordance with an embodiment, the first short side 1405 can have a length that is not greater than about 60% of a length of the first long side 1402. In other embodiments, the length of the first short side 1405 relative to the first long side 1402 can be less, such as not greater than about 50%, or not greater than about 40%, not greater than about 30%, not greater than about 20%, or even not greater than about 15%. Still, the first short side 1405 can be at least about 2%, such as at least about 5%, at least about 10%, at least about 15%, or even at least about 20% of the length of the first long side 1402. It will be appreciated that the length of the first short side 1405 can be within a range between any of the minimum and maximum percentages noted above. Furthermore, it will be appreciated that the length of the second short side 1406 can have the same characteristics of the first short side 1405 relative to the first long side 1402. Additionally, the length of the second short side 1406 may differ with respect to the length of the first short side 1405.

In accordance with an embodiment, the first long side 1402 can have a length (l1) that is substantially equal to the length (l2) of the second long side 1403. Still, the length (l1) of the first long side 1402 may be significantly different than the length (l2) of the second long side 1403. Moreover, the length (l1) of the first long side 1402 may be substantially the same as the length (l3) of the third long side 1404. Alternatively, the length (l1) of the first long side 1402 may be significantly different that the length (l3) of the third long side 1404. Additionally, the length (l2) of the second long side 1403 may be substantially the same as the length (l3) of the third long side 1404. Alternatively, the length (l2) of the second long side 1403 may be significantly different than the length (l3) of the third long side 1404.

Figure 14B:
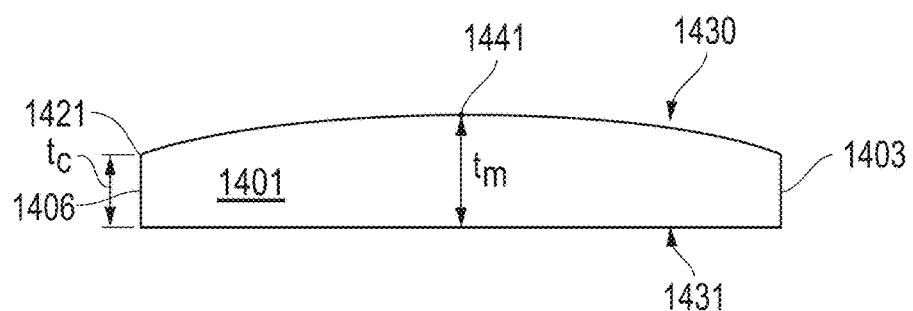
FIGS. 14B and 14C include cross-sectional illustrations of a portion of the shaped abrasive particle of FIG. 13A.

FIG. 14B includes a cross-sectional illustration of a portion of the shaped abrasive particle of FIG. 14A. Notably, the cross-sectional image is taken through the axis 1450 which is defined by a point at one corner 1421 of the body 1401 and a midpoint 1441 of the body 1401. In accordance with a particular embodiment, the body 1401 can have a greater thickness at a midpoint 1441 of the shaped abrasive particle as compared to the thickness of the body measured at the corner 1421. In certain instances, the shaped abrasive particles can have a corner/midpoint differential thickness of at least 1.1, wherein the corner/midpoint differential thickness (c/mΔt) is a measure of the thickness of the body at the midpoint divided by the thickness of at least one corner. In certain embodiments, the corner/midpoint differential thickness can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the corner/midpoint differential thickness (c/mΔt) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having a corner/midpoint differential thickness (c/mΔt) within a range between any of the minimum and maximum values noted above.

It will be appreciated that the above characteristics can be attributed to a batch of shaped abrasive particles. The batch can include a sample of at least about 20 discrete shaped abrasive particles selected at random. Each of the discrete shaped abrasive particles of the sample can be measured to determine average dimensions of midpoint thickness and corner thickness of the sample that are representative of the batch.

Figure 14C:
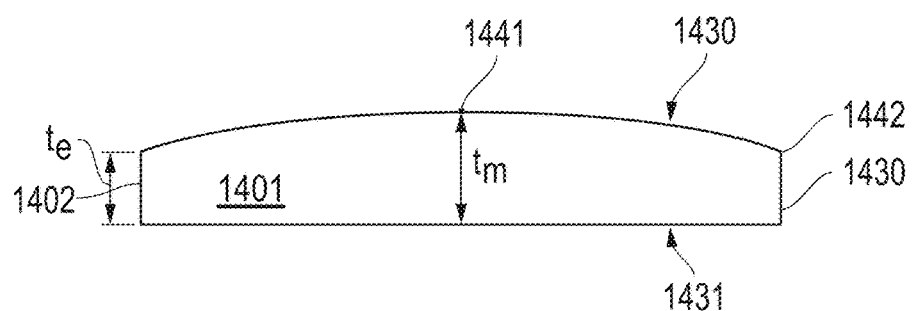

FIG. 14C includes a cross-sectional illustration of a portion of the shaped abrasive particle of FIG. 14A. In particular, FIG. 14C includes a cross-sectional illustration of the shaped abrasive particle along axis 1460, which is defined as an axis extending through the midpoint 1441 and a midpoint 1442 of a side 1403 of the body 1401. In accordance with one embodiment, the body 1401 can have a greater thickness at a midpoint 1441 of the body 1401 than a thickness at a midpoint edge 1442 of the body 1401. Notably, the shaped abrasive particles can have an edge/midpoint differential thickness (e/mΔt) of at least 1.1, wherein the edge/midpoint differential thickness is a measure of the thickness of the body at the midpoint 1341 divided by the thickness of a side surface at the midpoint between two corners. In other embodiments, the edge/midpoint differential thickness (e/mΔt) can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the edge/midpoint differential thickness (e/mΔt) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having an edge/midpoint differential thickness (e/mΔt) within a range between any of the minimum and maximum values noted above.

It will be appreciated that the above characteristics can be attributed to a batch of shaped abrasive particles. The batch can include a sample of at least about 20 discrete shaped abrasive particles selected at random. Each of the discrete shaped abrasive particles of the sample can be measured to determine average dimensions of midpoint thickness and corner thickness of the sample that are representative of the batch.

Figure 15:
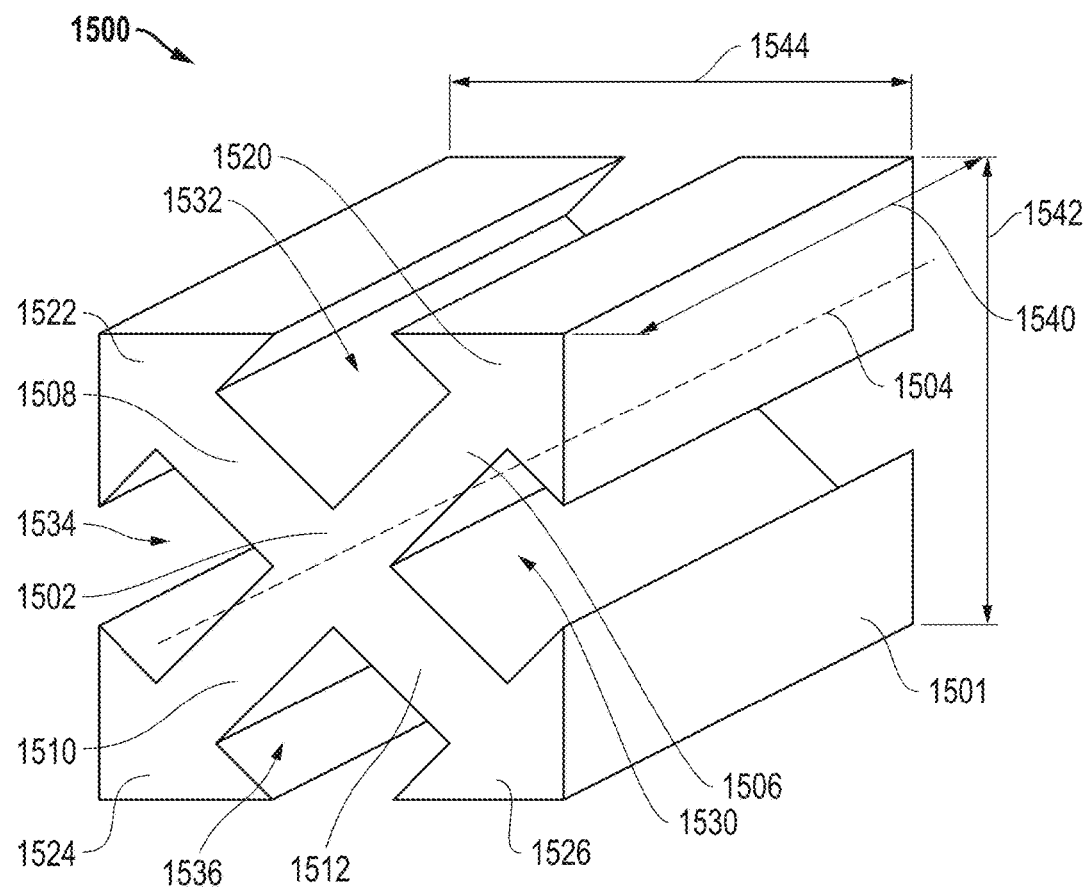
FIGS. 15-17 include illustrations of shaped abrasive particles according to embodiments.

FIG. 15 includes an illustration of a shaped abrasive particle according to another embodiment. As depicted, the shaped abrasive particle 1500 may include a body 1501 that may be formed according to an embodiment herein. Notably, the shaped abrasive particle may be formed from an extruded sheet via a punching process. The body 1501 can include a central portion 1502 that extends along a longitudinal axis 1504. A first radial arm 1506 may extend outwardly from the central portion 1502 along the length of the central portion 1502. A second radial arm 1508 may extend outwardly from the central portion 1502 along the length of the central portion 1502. A third radial arm 1510 may extend outwardly from the central portion 1502 along the length of the central portion 1502. Moreover, a fourth radial arm 1512 may extend outwardly from the central portion 1502 along the length of the central portion 1502. The radial arms 1506, 1508, 1510, and 1512 may be equally spaced around the central portion 1502 of the shaped abrasive particle 1500.

As shown in FIG. 15, the first radial arm 1506 may include a generally arrow shaped distal end 1520. The second radial arm 1508 may include a generally arrow shaped distal end 1522. The third radial arm 1510 may include a generally arrow shaped distal end 1524. Further, the fourth radial arm 1512 may include a generally arrow shaped distal end 1526.

FIG. 15 also illustrates that the shaped abrasive particle 1500 may be formed with a first void 1530 between the first radial arm 1506 and the second radial arm 1508. A second void 1532 may be formed between the second radial arm 1508 and the third radial arm 1510. A third void 1534 may also be formed between the third radial arm 1510 and the fourth radial arm 1512. Additionally, a fourth void 1536 may be formed between the fourth radial arm 1512 and the first radial arm 1506.

Figure 16:
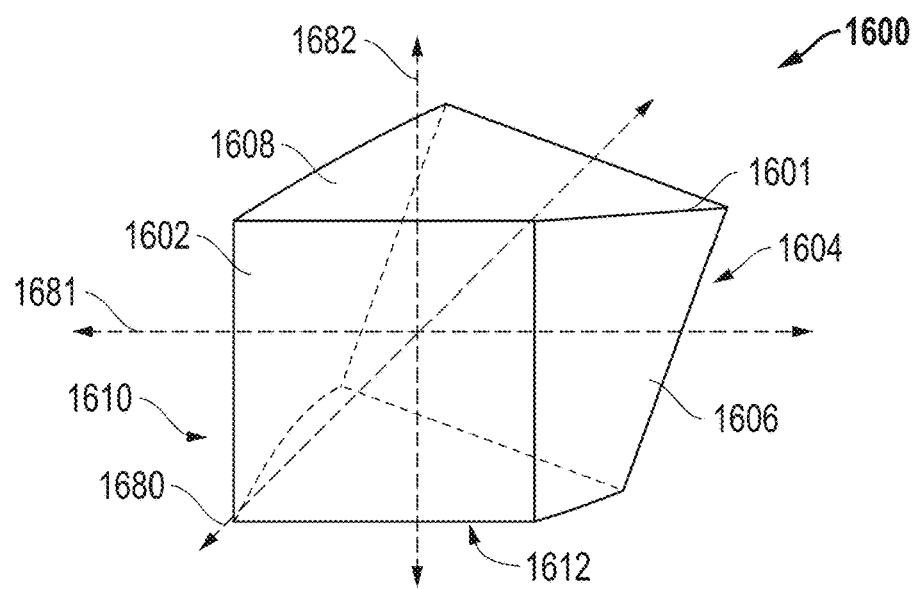
Figure 17:
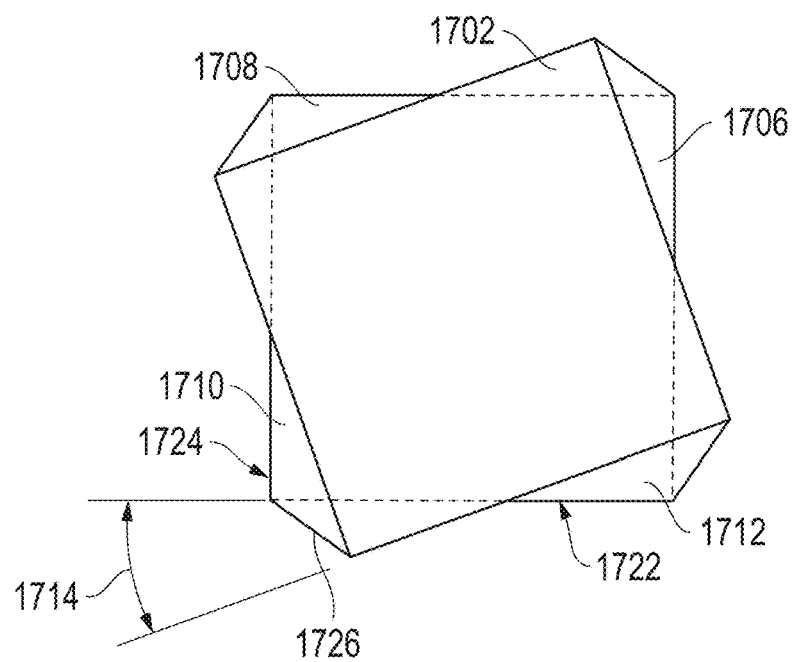

FIGS. 16 and 17 include an illustration of a shaped abrasive particle according to another embodiment. As shown, the shaped abrasive particle 1600 may include a body 1601 that has a generally cube-like shape. It will be appreciated that the shaped abrasive particle may be formed to have other polyhedral shapes. The body 1601 may have a first end face 1602 and a second end face 1604, a first lateral face 1606 extending between the first end face 1602 and the second end face 1604, a second lateral face 1608 extending between the first end face 1602 and the second end face 1604. Further, the body 1601 can have a third lateral face 1610 extending between the first end face 1602 and the second end face 1604, and a fourth lateral face 1612 extending between the first end face 1602 and the second end face 1604.

As shown, the first end face 1602 and the second end face 1604 can be parallel to each other and separated by the lateral faces 1606, 1608, 1610, and 1612, giving the body a cube-like structure. However, in a particular aspect, the first end face 1602 can be rotated with respect to the second end face 1604 to establish a twist angle 1614. In particular instances, the shaped abrasive particle 1600 can be formed from the processes described herein, including sectioning a sheet, and more particularly sectioning a sheet that has been torqued or twisted in a particular manner to impart a twist angle to the finally-formed shaped abrasive particle. In certain instances, the twist of the body 1601 can be along one or more axes and define particular types of twist angles. For example, as illustrated in a top-down view of the body in FIG. 17 looking down the longitudinal axis 1680 defining a length of the body 1601 on the end face 1602 parallel to a plane defined by the lateral axis 1681 extending along a dimension of width of the body 1601 and the vertical axis 1682 extending along a dimension of height of the body 1601.

According to one embodiment, the body 1601 can have a longitudinal twist angle 1614 defining a twist in the body 1601 about the longitudinal axis such that the end faces 1602 and 1604 are rotated relative to each other. The twist angle 1614, as illustrated in FIG. 17 can be measured as the angle between a tangent of a first edge 1622 and a second edge 1624, wherein the first edge 1622 and second edge 1624 are joined by and share a common edge 1626 extending longitudinally between two of the lateral faces (1610 and 1612). It will be appreciated that other shaped abrasive particles can be formed to have twist angles relative to the lateral axis, the vertical axis, and a combination thereof. Any such twist angles can have a value as described in the embodiments herein.

In a particular aspect, the twist angle 1614 can be at least about 1°. In other instances, the twist angle 1614 can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 1614 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Figure 18:
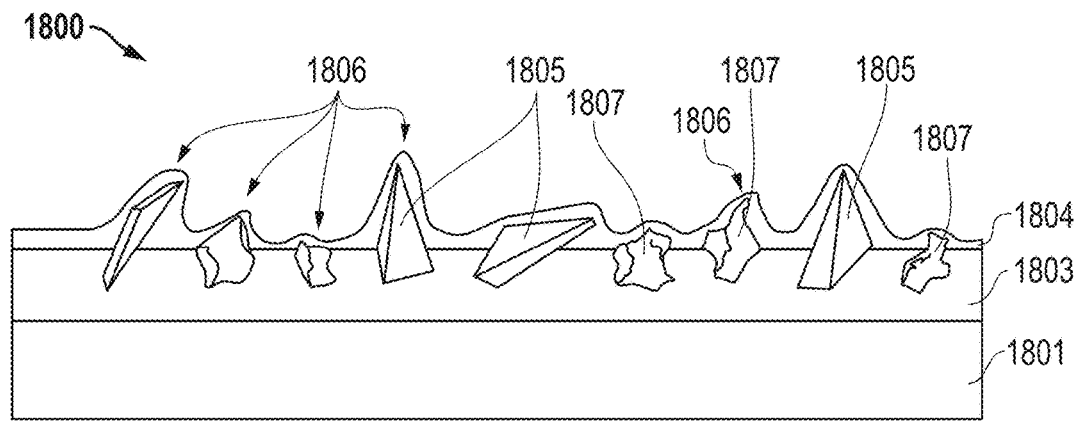
FIG. 18 includes a coated abrasive including shaped abrasive particles according to an embodiment.

FIG. 18 includes a cross-sectional illustration of a coated abrasive article incorporating the abrasive particulate material in accordance with an embodiment. As illustrated, the coated abrasive 1800 can include a substrate 1801 and a make coat 1803 overlying a surface of the substrate 1801. The coated abrasive 1800 can further include abrasive particulate material 1806. The abrasive particulate material can include a first type of shaped abrasive particle 1805, a second type of abrasive particulate material 1807 in the form of diluent abrasive particles having a random shape, which may not necessarily be shaped abrasive particles. The coated abrasive 1800 may further include size coat 1804 overlying and bonded to the abrasive particulate material 1806 and the make coat 1804.

According to one embodiment, the substrate 1801 can include an organic material, inorganic material, and a combination thereof. In certain instances, the substrate 1801 can include a woven material. However, the substrate 1801 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1803 can be applied to the surface of the substrate 1801 in a single process, or alternatively, the abrasive particulate materials 1806 can be combined with a make coat 1803 material and applied as a mixture to the surface of the substrate 1801. Suitable materials of the make coat 1803 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1803 can include a polyester resin. The coated substrate can then be heated in order to cure the resin and the abrasive particulate material to the substrate. In general, the coated substrate 1801 can be heated to a temperature of between about 100° C. to less than about 250° C. during this curing process.

The abrasive particulate material 1806 can include shaped abrasive particles according to embodiments herein. In particular instances, the abrasive particulate material 1806 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 1800 can include a shaped abrasive particle 1805 having a generally triangular two-dimensional shape.

The other type of abrasive particles 1807 can be diluent particles different than the shaped abrasive particles 1805. For example, the diluent particles can differ from the shaped abrasive particles 1805 in composition, two-dimensional shape, three-dimensional shape, size, and a combination thereof. For example, the abrasive particles 1807 can represent conventional, crushed abrasive grit having random shapes. The abrasive particles 1807 may have a median particle size less than the median particle size of the shaped abrasive particles 1805.

After sufficiently forming the make coat 1803 with the abrasive particulate material 1806, the size coat 1804 can be formed to overlie and bond the abrasive particulate material 1806 in place. The size coat 1804 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 19:
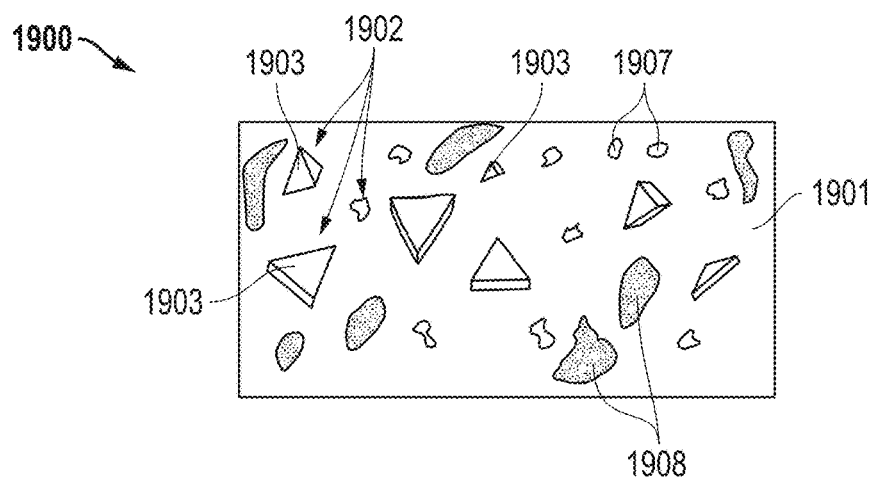
FIG. 19 includes a bonded abrasive including shaped abrasive particles according to an embodiment.

FIG. 19 includes an illustration of a bonded abrasive article incorporating the abrasive particulate material in accordance with an embodiment. As illustrated, the bonded abrasive 1900 can include a bond material 1901, abrasive particulate material 1902 contained in the bond material, and porosity 1908 within the bond material 1901. In particular instances, the bond material 1901 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 1902 of the bonded abrasive 1900 can include shaped abrasive particles 1903. In particular instances, the shaped abrasive particles 1903 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 1900 can include a type of abrasive particulate material 1907 representing diluent abrasive particles, which can differ from the shaped abrasive particles 1903 in composition, two-dimensional shape, three-dimensional shape, size, and a combination thereof.

The porosity 1908 of the bonded abrasive 1900 can be open porosity, closed porosity, and a combination thereof. The porosity 1908 may be present in a majority amount (vol %) based on the total volume of the body of the bonded abrasive 1900. Alternatively, the porosity 1908 can be present in a minor amount (vol %) based on the total volume of the body of the bonded abrasive 1900. The bond material 1901 may be present in a majority amount (vol %) based on the total volume of the body of the bonded abrasive 1900. Alternatively, the bond material 1901 can be present in a minor amount (vol %) based on the total volume of the body of the bonded abrasive 1900. Additionally, abrasive particulate material 1902 can be present in a majority amount (vol %) based on the total volume of the body of the bonded abrasive 1900. Alternatively, the abrasive particulate material 1902 can be present in a minor amount (vol %) based on the total volume of the body of the bonded abrasive 1900.

Figure 21:
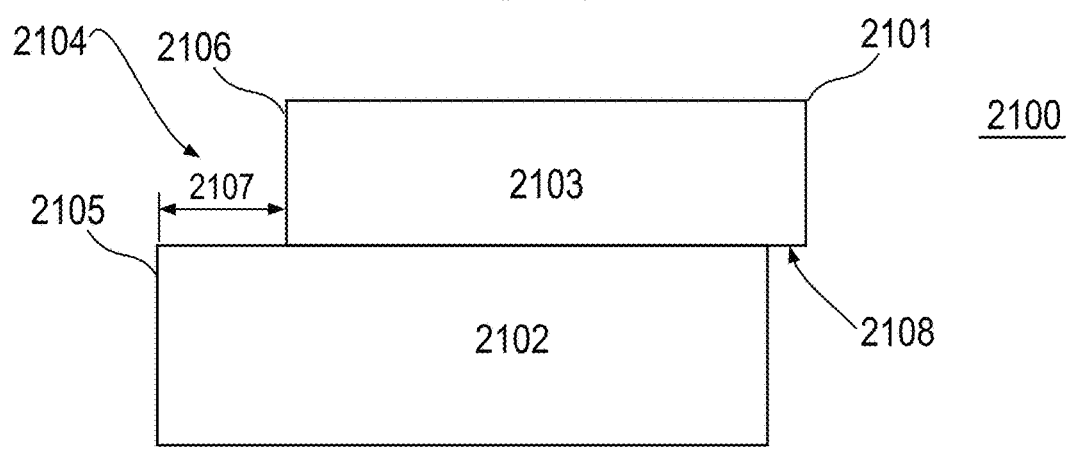
FIG. 21 includes a perspective view illustration of a shaped abrasive particle according to an embodiment.

FIG. 21 includes an illustration of a side view of a shaped abrasive particle according to an embodiment. As illustrated, the shaped abrasive particle 2100 can include a body 2101 including a first layer 2102 and a second layer 2103 overlying the first layer 2102. According to an embodiment, the body 2101 can have layers 2102 and 2103 that are arranged in a stepped configuration relative to each other. A stepped configuration can be characterized by a degree of misorientation between two or more portions (e.g., layers) of a body of a shaped abrasive particle. The degree of misorientation may be controlled or predetermined by one or more processing parameters and may facilitate an improved deployment of the abrasive particles into an abrasive article and performance of the abrasive article.

The stepped configuration may be defined by a lateral shift 2104, which may be defined as the greatest lateral distance 2107 between a first edge 2105 of the first layer 2102 and a second edge 2106 of the second layer 2106. Notably, the body 2101 also demonstrates a stepped configuration 2108, wherein a portion of the second layer 2103 overhangs the first layer 2102, however such a stepped configuration may not necessarily define the lateral shift of the body 2101, since the lateral shift 2104 has a greater lateral distance 2107 as compared to the lateral distance of the stepped configuration 2108. Furthermore, as noted in FIG. 20B, the lateral shift 2109 may be measured by the distance 2110 between an edge of the first layer 2002 and an edge of the second layer 2003 in a direction toward a midpoint 2020 of the body 2001 to make analysis of the lateral shift feasible from a top-view. Any features of the embodiments herein, including for example, lateral shift may be analyzed using suitable imaging software, including for example, ImageJ software.

According to one embodiment, the body 2101 can have a lateral shift defined by a lateral distance 2107 of at least about 1% of the length of the body 2101. In other embodiments, the lateral distance 2107 can be greater, such as at least about 2%, at least about 5%, at least about 8%, at least about 10%, at least about 20%, at least about 25%, at least about 30%, or even at least about 50% of the length of the body 2101. In still one non-limiting embodiment, the lateral distance 2107 can be not greater than about 90%, such as not greater than about 80%, not greater than about 70%, not greater than about 60%, not greater than about 50%, not greater than about 40%, not greater than about 30%, or even not greater than about 20% of the length of the body 2101.

It will be appreciated that any of the characteristics of the embodiments herein can be attributed to a batch of shaped abrasive particles. A batch of shaped abrasive particle can include, but need not necessarily include, a group of shaped abrasive particles made through the same forming process. In yet another instance, a batch of shaped abrasive particles can be a group of shaped abrasive particles of an abrasive article, such as a fixed abrasive article, and more particularly, a coated abrasive article, which may be independent of a particular forming method, but having one or more defining features present in a particular population of the particles. For example, a batch of particles may include an amount of shaped abrasive particles suitable for forming a commercial grade abrasive product, such as at least about 20 lbs. of particles.

Moreover, any of the features of the embodiments herein (e.g., aspect ratio, multiple portions, multiple layers, diffusion interfaces, difference in thickness, difference in two-dimensional shape, etc.) can be part of a single particle, a median value from a sampling of particles of a batch, or an average value derived from analysis of a sampling of particles from a batch. Unless stated explicitly, reference herein to the characteristics can be considered reference to a median value that is based on a statistically significant value derived from a random sampling of suitable number of particles of a batch. Notably, for certain embodiments herein, the sample size can include at least 10, and more typically, at least 40 randomly selected particles from a batch of particles.

Any of the features described in the embodiments herein can represent features that are present in at least a portion of a batch of shaped abrasive particles. The portion may be a minority portion (e.g., less than 50% and any whole number integer between 1% and 49%) of the total number of particles in a batch, a majority portion (e.g., 50% or greater and any whole number integer between 50% and 99%) of the total number of particles of the batch, or even essentially all of the particles of a batch (e.g., between 99% and 100%). The provision of one or more features of any shaped abrasive particle of a batch may facilitate alternative or improved deployment of the particles in an abrasive article and may further facilitate improved performance or use of the abrasive article.

A batch of particulate material can include a first portion including a first type of shaped abrasive particle and a second portion including a second type of shaped abrasive particle. The content of the first portion and second portion within the batch may be controlled at least in part based upon certain processing parameters. Provision of a batch having a first portion and a second portion may facilitate alternative or improved deployment of the particles in an abrasive article and may further facilitate improved performance or use of the abrasive article.

The first portion may include a plurality of shaped abrasive particles, wherein each of the particles of the first portion can have substantially the same features, such as a same two-dimensional shape, a same configuration of portions making substantially similar composite bodies (e.g., same number or orientation of layers), and the like. The batch may include various contents of the first portion. For example, the first portion may be present in a minority amount or majority amount. In particular instances, the first portion may be present in an amount of at least about 1%, such as at least about 5%, at least about 10%, at least about 20%, at least about 30%, at least about 40%, at least about 50%, at least about 60%, or even at least about 70% for the total content of portions within the batch. Still, in another embodiment, the batch may include not greater than about 99%, such as not greater than about 90%, not greater than about 80%, not greater than about 70%, not greater than about 60%, not greater than about 50%, not greater than about 40%, not greater than about 30%, not greater than about 20%, not greater than about 10%, not greater than about 8%, not greater than about 6%, or even not greater than about 4% of the total portions within the batch. The batch can include a content of the first portion within a range between any of the minimum and maximum percentages noted above.

The second portion can include a plurality of shaped abrasive particles, wherein each of the shaped abrasive particles of the second portion can have substantially the same type of two-dimensional shape. The second portion can have one or more features of the embodiments herein, which can be distinct compared to the plurality of shaped abrasive particles of the first portion. In certain instances, the batch may include a lesser content of the second portion relative to the first portion, and more particularly, may include a minority content of the second portion relative to the total content of particles in the batch. For example, the batch may contain a particular content of the second portion, including for example, not greater than about 40%, such as not greater than about 30%, not greater than about 20%, not greater than about 10%, not greater than about 8%, not greater than about 6%, or even not greater than about 4%. Still, in at least on non-limiting embodiment, the batch may contain at least about 0.5%, such as at least about 1%, at least about 2%, at least about 3%, at least about 4%, at least about 10%, at least about 15%, or even at least about 20% of the second portion for the total content of portions within the batch. It will be appreciated that the batch can contain a content of the second portion within a range between any of the minimum and maximum percentages noted above.

Still, in an alternative embodiment, the batch may include a greater content of the second portion relative to the first portion, and more particularly, can include a majority content of the second portion for the total content of particles in the batch. For example, in at least one embodiment, the batch may contain at least about 55%, such as at least about 60% of the second portion for the total portions of the batch.

In one particular embodiment, the batch can include a first portion including a plurality of shaped abrasive particles, wherein each of the particles have a body including a first layer and a second layer overlying the first layer. The batch may include a second portion including a plurality of shaped abrasive particles, wherein each of the particles have a body including a first layer, a second layer overlying the first layer, and an intermediate layer disposed between the first layer and the second layer. It will be appreciated that the foregoing embodiment is one of a variety of exemplary batches that can include at least first and second portions, wherein each of the portions include a plurality of shaped abrasive particles, and each of the particles of the different portions have at least one feature distinct from each other.

It will be appreciated that the batch can include other portions, including for example a third portion, comprising a plurality of shaped abrasive particles having a third feature that can be distinct from the features of the particles of the first and second portions. The batch may include various contents of the third portion relative to the second portion and first portion. The third portion may be present in a minority amount or majority amount. In particular instances, the third portion may be present in an amount of not greater than about 40%, such as not greater than about 30%, not greater than about 20%, not greater than about 10%, not greater than about 8%, not greater than about 6%, or even not greater than about 4% of the total portions within the batch. Still, in other embodiments the batch may include a minimum content of the third portion, such as at least about 1%, such as at least about 5%, at least about 10%, at least about 20%, at least about 30%, at least about 40%, or even at least about 50%. The batch can include a content of the third portion within a range between any of the minimum and maximum percentages noted above. Moreover, the batch may include a content of diluent, randomly shaped abrasive particles, which may be present in an amount the same as any of the portions of the embodiments herein.

Example

A first mixture in the form of a gel is made including 35-46 wt % boehmite commercially from Sasol Corporation. The mixture also includes water, and a minor content of nitric acid, and organic material. The first mixture is printed into openings of a first screen having equilateral triangular-shaped openings having a length of a side of approximately 1-2.5 mm, forming a first group of precursor shaped abrasive particles in the first screen.

A second mixture in the form of a gel is made using the first mixture with an additive of approximately 1 wt % for a total weight of the solids of a dopant precursor. The dopant precursor is acetate stabilized colloidal zirconia commercially available as Nyacol. A second screen is placed over the first group of precursor shaped particles. The second screen has equilateral triangular-shaped openings having a length of a side of approximately 1-2.5 mm. The second mixture is printed into the openings of the second screen and onto the surfaces of the first group of precursor shaped abrasive particles. The particles are dried and then sintered at 1300° C. to 1400° C. for 15 minute to 1 hour in air.

Figure 22:
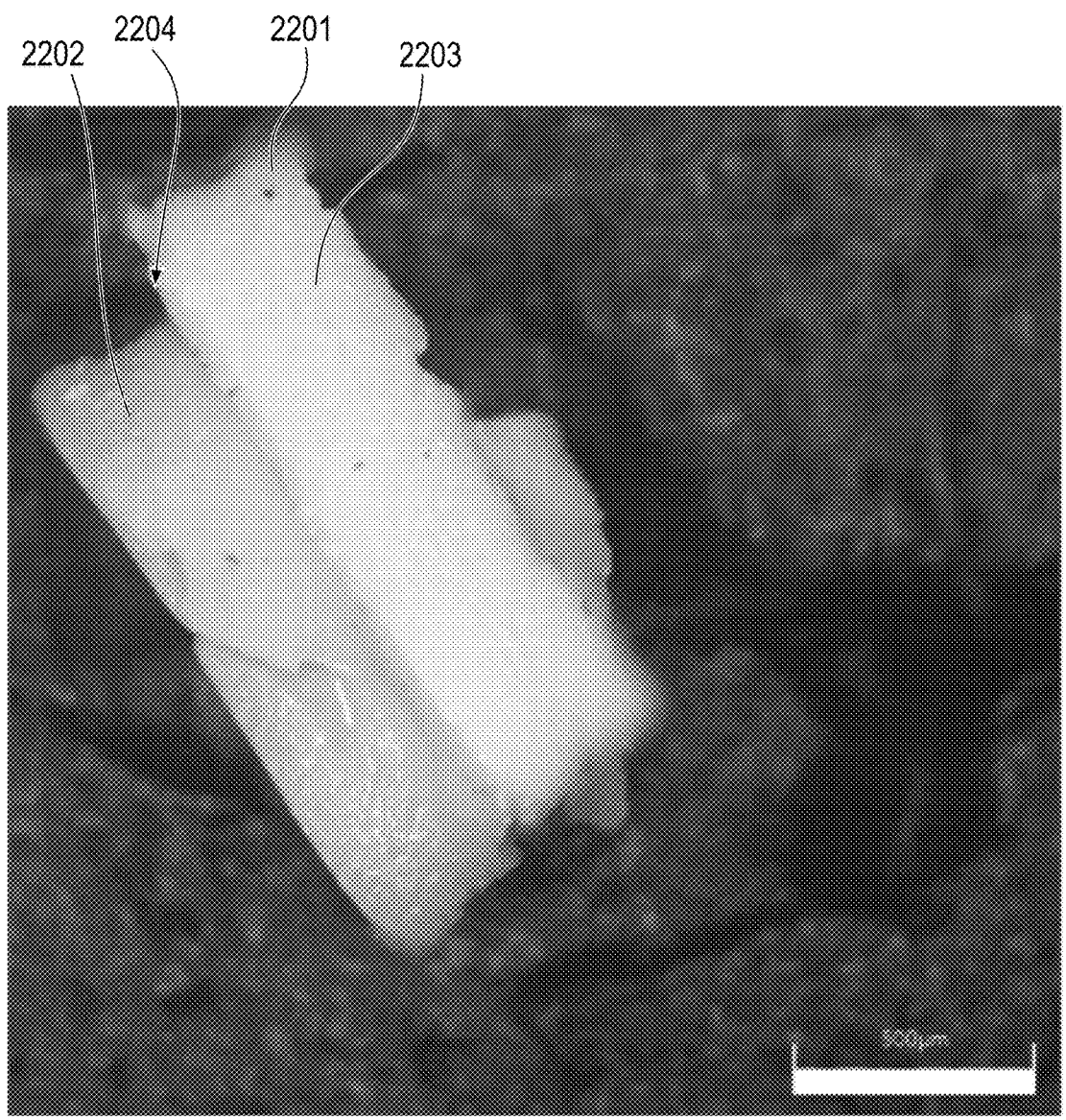
FIG. 22 includes an image of a shaped abrasive particle according to an embodiment.

Particles were formed according to Example 1 and subject to imaging analysis. FIG. 22 includes a side view image of a shaped abrasive particle formed according to the embodiment of Example 1. As illustrated, the body 2201 has a first layer 2202 and a second layer 2203 overlying the first layer 2202. The layers 2202 and 2203 are oriented in a stepped configuration and define a lateral shift distance of approximately 17% relative to the length of the body as measured by length of the side of the second layer 2203 as shown in the image. A significant portion of the particles formed according to Example 1 demonstrated this stepped configuration.

Figure 23A:
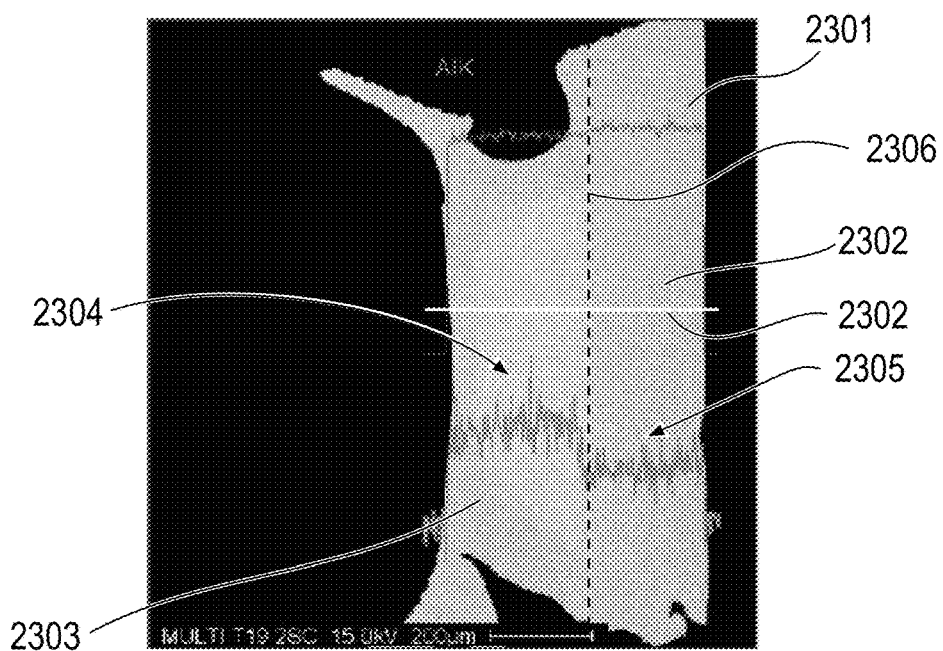
FIGS. 23A and 23B include images of shaped abrasive particles having layers according to an embodiment.
Figure 23B:
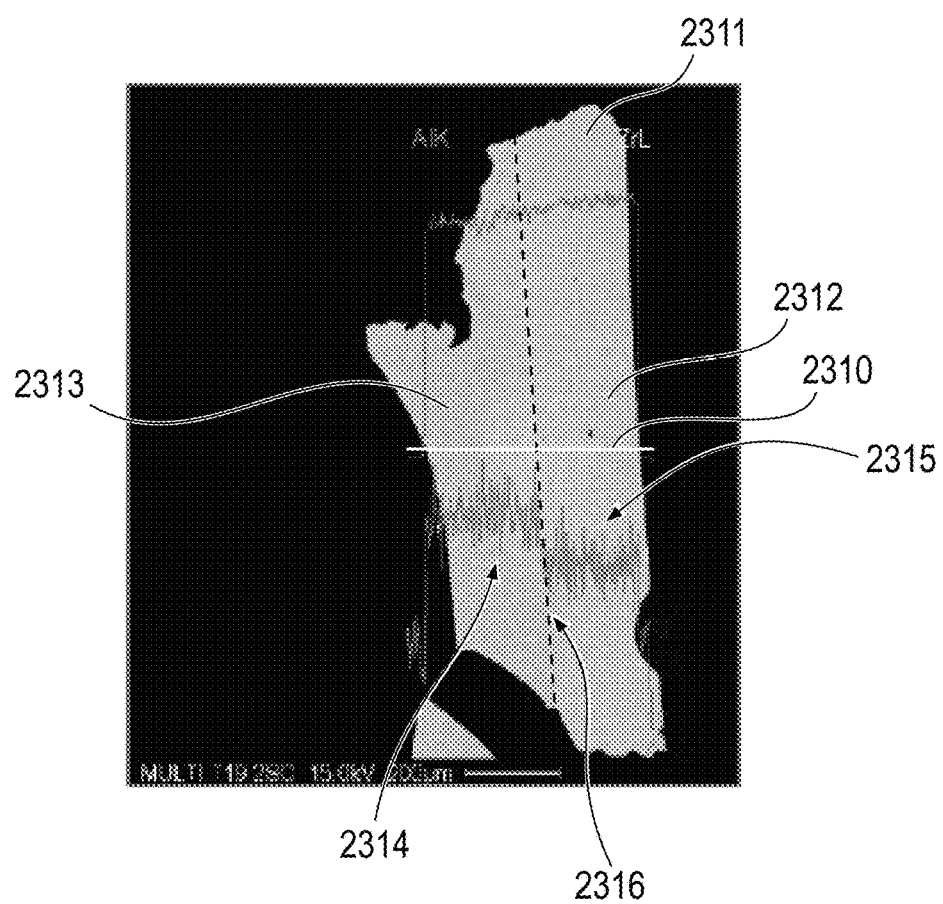

FIGS. 23A and 23B include images of the shaped abrasive particles made according to Example 1. The shaped abrasive particle of FIG. 23A has a body 2301 including a first layer 2302 and a second layer 2303 overlying the first layer 2302. As shown, an elemental line scan was conducted at line 2300 across the thickness of the body 2301 to analyze the diffusion profile of the zirconium-containing dopant material of the second layer 2303 into the first layer 2302. Notably, within the second layer 2303, the content of the dopant as shown at 2304 is significantly different as compared to the content of the dopant in the first layer 2302 as shown at 2305. In particular, the content of dopant in the second layer 2303 is significantly greater than the content of dopant in the first layer 2302.

The body 2301 includes a diffusion interface 2306 defined by the step function difference in the concentration of the dopant between the first layer 2302 and the second layer 2302. While some diffusion of the dopant material has occurred from the second layer 2303 into the first layer 2302, the diffusion interface is evident based on the difference in zirconium content at 2304 in the second layer 2303 compared to the content of zirconium measured at 2305 in the first layer 2302.

The shaped abrasive particle of FIG. 23B has a body 2311 including a first layer 2312 and a second layer 2313 overlying the first layer 2312. As shown, an elemental line scan was conducted at line 2310 across the thickness of the body 2311 to analyze the diffusion profile of the zirconium-containing dopant material of the second layer 2313 into the first layer 2312. Notably, within the second layer 2313, the content of the dopant as shown at 2314 is significantly different, and in particular, significantly greater, as compared to the content of the dopant in the first layer 2312 as shown at 2315. Moreover, the body 2311 has an evident diffusion interface 2316 defined by the step function difference in the concentration of the dopant between the first layer 2312 and the second layer 2313. While some diffusion of the dopant material has occurred from the second layer 2313 into the first layer 2312, the diffusion interface 2316 is apparent based on the difference in zirconium content at 2314 in the second layer 2313 compared to the content of zirconium measured at 2315 in the first layer 2312.

The present application represents a departure from the state of the art. While the industry has recognized that shaped abrasive particles may be formed through processes such as molding and screen printing, the processes of the embodiments herein are distinct from such processes. Notably, the embodiments herein include a combination of process features facilitating the formation of batches of shaped abrasive particle having particular features. Moreover, the shaped abrasive particles of the embodiments herein can have a particular combination of features distinct from other particles including, but not limited to, aspect ratio, composition, additives, two-dimensional shape, three-dimensional shape, stepped configuration, different two-dimensional shapes, diffusion interfaces, difference in dopant concentration for different portions, layers, and regions, and a combination thereof. And in fact, one or more such features are expected to facilitate alternative deployments in abrasive articles, and further, may facilitate improved performance in the context of fixed abrasives, such as bonded abrasives or coated abrasives.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A particulate material comprising:
   a shaped abrasive particle having a body comprising:
      a first layer;
      a second layer overlying the first layer; and
      a diffusion interface disposed between the first layer and the second layer,
      wherein the second layer comprises a dopant;
      wherein the diffusion interface defines a step function difference in a concentration of the dopant in the second layer compared to a concentration of the dopant in the first layer; and
      wherein the diffusion interface separates a region of the first layer having a first dopant concentration (D1c) and a region of the second layer having a second dopant concentration (D2c).

2. The particulate material of claim 1, wherein the diffusion interface extends for an entire area between the first layer and the second layer.

3. The particulate material of claim 1, wherein the diffusion interface extends for an entire length of the body.

4. The particulate material of claim 1, wherein the diffusion interface extends for an entire width of the body.

5. The particulate material of claim 1, wherein the difference between the first dopant concentration and the second dopant concentration is a dopant concentration difference (ΔDc) of at least about 0.2 wt %.

6. The particulate material of claim 5, wherein the dopant concentration difference (ΔDc) is not greater than about 30 wt %.

7. The particulate material of claim 1, wherein the first layer comprises the dopant.

8. The particulate material of claim 1, wherein the dopant is selected from the group consisting of alkali elements, alkaline earth elements, rare-earth elements, hafnium (Hf), zirconium (Zr), niobium (Nb), tantalum (Ta), molybdenum (Mo), and a combination thereof.

9. The particulate material of claim 1, wherein the first layer and the second layer differ in composition by at least a dopant material selected from the group consisting of lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), niobium (Nb), tantalum (Ta), molybdenum (Mo), and a combination thereof.

10. The particulate material of claim 1, wherein the first layer comprises a first thickness and the second layer comprises a second thickness, wherein the first thickness and the second thickness are substantially the same.

11. The particulate material of claim 1, wherein the first layer comprises a first thickness and the second layer comprises a second thickness, and wherein the first thickness and the second thickness are different from each other by at least about 5%.

12. The particulate material of claim 1, wherein the dopant comprises zirconium.

13. The particulate material of claim 1, wherein the first layer defines a first two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

14. The particulate material of claim 13, wherein the second layer defines a second two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

15. The particulate material of claim 14, wherein the second two-dimensional shape is different than the first two-dimensional shape.

16. The particulate material of claim 1, further comprising an intermediate layer disposed between the first layer and the second layer, wherein the diffusion interface is disposed between the second layer and the intermediate layer, and further comprising an intermediate diffusion layer disposed at an interface of the first layer and the intermediate layer.

17. The particulate material of claim 1, wherein the first layer is essentially free of the dopant.

* * * * *